US011518377B2

(12) United States Patent
Lu et al.

(10) Patent No.: US 11,518,377 B2
(45) Date of Patent: *Dec. 6, 2022

(54) VEHICULAR VISION SYSTEM

(71) Applicant: MAGNA ELECTRONICS INC., Auburn Hills, MI (US)

(72) Inventors: Yuesheng Lu, Farmington Hills, MI (US); Joel S. Gibson, Linden, MI (US); Duane W. Gebauer, Gregory, MI (US); Richard D. Shriner, Grand Blanc, MI (US); Patrick A. Miller, Grand Blanc, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 220 days.

This patent is subject to a terminal disclaimer.

(21) Appl. No.: 17/247,694

(22) Filed: Dec. 21, 2020

(65) Prior Publication Data

US 2021/0107474 A1 Apr. 15, 2021

Related U.S. Application Data

(60) Continuation of application No. 16/166,325, filed on Oct. 22, 2018, now Pat. No. 10,875,526, which is a
(Continued)

(51) Int. Cl.
*B60W 30/09* (2012.01)
*B60R 1/00* (2022.01)
(Continued)

(52) U.S. Cl.
CPC ............... *B60W 30/09* (2013.01); *B60R 1/00* (2013.01); *B62D 15/0295* (2013.01);
(Continued)

(58) Field of Classification Search
CPC ..... B60W 30/09; B60W 2420/42; B60R 1/00; B60R 2300/105; B60R 2300/305;
(Continued)

(56) References Cited

U.S. PATENT DOCUMENTS 4,200,361 A 4/1980 Malvano et al.
4,214,266 A 7/1980 Myers
(Continued)

FOREIGN PATENT DOCUMENTS

EP 0426503 A1 5/1991
EP 0492591 A1 7/1992
(Continued)

OTHER PUBLICATIONS

G. Wang, D. Renshaw, P.B. Denyer and M. Lu, CMOS Video Cameras, article, 1991, 4 pages, University of Edinburgh, UK.
(Continued)

*Primary Examiner* — Aaron L Troost
(74) *Attorney, Agent, or Firm* — Honigman LLP

(57) ABSTRACT

A vehicular vision system includes a camera, a distance sensor and a controller having at least one processor. Image data captured by the camera and sensor data captured by the distance sensor are processed at the controller. The controller, responsive to processing of captured image data and of captured sensor data, detects an object. The controller determines the distance to the detected object based at least in part on difference between the positions of the detected object in captured image data and in captured sensor data. The controller, responsive to processing of captured image data and of captured sensor data, and responsive to the determined distance to the detected object, determines that the detected object represents a collision risk. The controller alerts a driver of the vehicle of the collision risk and/or controls the vehicle to mitigate the collision risk.

26 Claims, 10 Drawing Sheets

Related U.S. Application Data continuation of application No. 15/349,011, filed on Nov. 11, 2016, now Pat. No. 10,106,155, which is a division of application No. 13/384,673, filed as application No. PCT/US2010/043363 on Jul. 27, 2010, now Pat. No. 9,495,876.

(60) Provisional application No. 61/228,659, filed on Jul. 27, 2009.

(51) Int. Cl.
| | |
|---|---|
| *H04N 5/232* | (2006.01) |
| *B62D 15/02* | (2006.01) |
| *H04N 5/357* | (2011.01) |
| *G08G 1/16* | (2006.01) |
| *G09G 5/14* | (2006.01) |

(52) U.S. Cl.
CPC ............ *G08G 1/168* (2013.01); *H04N 5/232* (2013.01); *H04N 5/23293* (2013.01); *H04N 5/3572* (2013.01); *B60R 2300/105* (2013.01); *B60R 2300/305* (2013.01); *B60R 2300/806* (2013.01); *B60W 2420/42* (2013.01); *G09G 5/14* (2013.01); *G09G 2340/125* (2013.01); *G09G 2380/10* (2013.01)

(58) Field of Classification Search
CPC .......... B60R 2300/806; B62D 15/0295; G08G 1/168; H04N 5/232; H04N 5/23203; H04N 5/3572; G09G 5/14; G09G 2340/125; G09G 2380/10
See application file for complete search history.

(56) References Cited

U.S. PATENT DOCUMENTS

| | | |
|---|---|---|
| 4,218,698 A | 8/1980 | Bart et al. |
| 4,236,099 A | 11/1980 | Rosenblum |
| 4,247,870 A | 1/1981 | Gabel et al. |
| 4,249,160 A | 2/1981 | Chilvers |
| 4,266,856 A | 5/1981 | Wainwright |
| 4,277,804 A | 7/1981 | Robison |
| 4,281,898 A | 8/1981 | Ochiai et al. |
| 4,288,814 A | 9/1981 | Talley et al. |
| 4,355,271 A | 10/1982 | Noack |
| 4,357,558 A | 11/1982 | Massoni et al. |
| 4,381,888 A | 5/1983 | Momiyama |
| 4,420,238 A | 12/1983 | Felix |
| 4,431,896 A | 2/1984 | Lodetti |
| 4,443,057 A | 4/1984 | Bauer et al. |
| 4,460,831 A | 7/1984 | Oettinger et al. |
| 4,481,450 A | 11/1984 | Watanabe et al. |
| 4,491,390 A | 1/1985 | Tong-Shen |
| 4,512,637 A | 4/1985 | Ballmer |
| 4,529,275 A | 7/1985 | Ballmer |
| 4,529,873 A | 7/1985 | Ballmer et al. |
| 4,546,551 A | 10/1985 | Franks |
| 4,549,208 A | 10/1985 | Kamejima et al. |
| 4,571,082 A | 2/1986 | Downs |
| 4,572,619 A | 2/1986 | Reininger et al. |
| 4,580,875 A | 4/1986 | Bechtel et al. |
| 4,600,913 A | 7/1986 | Caine |
| 4,603,946 A | 8/1986 | Kato et al. |
| 4,614,415 A | 9/1986 | Hyatt |
| 4,620,141 A | 10/1986 | McCumber et al. |
| 4,623,222 A | 11/1986 | Itoh et al. |
| 4,626,850 A | 12/1986 | Chey |
| 4,629,941 A | 12/1986 | Ellis et al. |
| 4,630,109 A | 12/1986 | Barton |
| 4,632,509 A | 12/1986 | Ohmi et al. |
| 4,638,287 A | 1/1987 | Umebayashi et al. |
| 4,647,161 A | 3/1987 | Muller |
| 4,653,316 A | 3/1987 | Fukuhara |
| 4,669,825 A | 6/1987 | Itoh et al. |
| 4,669,826 A | 6/1987 | Itoh et al. |
| 4,671,615 A | 6/1987 | Fukada et al. |
| 4,672,457 A | 6/1987 | Hyatt |
| 4,676,601 A | 6/1987 | Itoh et al. |
| 4,690,508 A | 9/1987 | Jacob |
| 4,692,798 A | 9/1987 | Seko et al. |
| 4,697,883 A | 10/1987 | Suzuki et al. |
| 4,701,022 A | 10/1987 | Jacob |
| 4,713,685 A | 12/1987 | Nishimura et al. |
| 4,717,830 A | 1/1988 | Botts |
| 4,727,290 A | 2/1988 | Smith et al. |
| 4,731,669 A | 3/1988 | Hayashi et al. |
| 4,741,603 A | 5/1988 | Miyagi et al. |
| 4,768,135 A | 8/1988 | Kretschmer et al. |
| 4,772,942 A | 9/1988 | Tuck |
| 4,789,904 A | 12/1988 | Peterson |
| 4,793,690 A | 12/1988 | Gahan et al. |
| 4,817,948 A | 4/1989 | Simonelli |
| 4,820,933 A | 4/1989 | Hong et al. |
| 4,825,232 A | 4/1989 | Howdle |
| 4,838,650 A | 6/1989 | Stewart et al. |
| 4,847,772 A | 7/1989 | Michalopoulos et al. |
| 4,855,822 A | 8/1989 | Narendra et al. |
| 4,862,037 A | 8/1989 | Farber et al. |
| 4,867,561 A | 9/1989 | Fujii et al. |
| 4,871,917 A | 10/1989 | O'Farrell et al. |
| 4,872,051 A | 10/1989 | Dye |
| 4,881,019 A | 11/1989 | Shiraishi et al. |
| 4,882,565 A | 11/1989 | Gallmeyer |
| 4,886,960 A | 12/1989 | Molyneux et al. |
| 4,891,559 A | 1/1990 | Matsumoto et al. |
| 4,892,345 A | 1/1990 | Rachael, III |
| 4,895,790 A | 1/1990 | Swanson et al. |
| 4,896,030 A | 1/1990 | Miyaji |
| 4,907,870 A | 3/1990 | Brucker |
| 4,910,591 A | 3/1990 | Petrossian et al. |
| 4,916,374 A | 4/1990 | Schierbeek et al. |
| 4,917,477 A | 4/1990 | Bechtel et al. |
| 4,937,796 A | 6/1990 | Tendler |
| 4,953,305 A | 9/1990 | Van Lente et al. |
| 4,956,591 A | 9/1990 | Schierbeek et al. |
| 4,961,625 A | 10/1990 | Wood et al. |
| 4,967,319 A | 10/1990 | Seko |
| 4,970,653 A | 11/1990 | Kenue |
| 4,971,430 A | 11/1990 | Lynas |
| 4,974,078 A | 11/1990 | Tsai |
| 4,987,357 A | 1/1991 | Masaki |
| 4,991,054 A | 2/1991 | Walters |
| 5,001,558 A | 3/1991 | Burley et al. |
| 5,003,288 A | 3/1991 | Wilhelm |
| 5,012,082 A | 4/1991 | Watanabe |
| 5,016,977 A | 5/1991 | Baude et al. |
| 5,027,001 A | 6/1991 | Torbert |
| 5,027,200 A | 6/1991 | Petrossian et al. |
| 5,044,706 A | 9/1991 | Chen |
| 5,055,668 A | 10/1991 | French |
| 5,059,877 A | 10/1991 | Teder |
| 5,064,274 A | 11/1991 | Alten |
| 5,072,154 A | 12/1991 | Chen |
| 5,086,253 A | 2/1992 | Lawler |
| 5,096,287 A | 3/1992 | Kakinami et al. |
| 5,097,362 A | 3/1992 | Lynas |
| 5,121,200 A | 6/1992 | Choi |
| 5,124,549 A | 6/1992 | Michaels et al. |
| 5,130,709 A | 7/1992 | Toyama et al. |
| 5,148,014 A | 9/1992 | Lynam et al. |
| 5,168,378 A | 12/1992 | Black |
| 5,170,374 A | 12/1992 | Shimohigashi et al. |
| 5,172,235 A | 12/1992 | Wilm et al. |
| 5,177,685 A | 1/1993 | Davis et al. |
| 5,182,502 A | 1/1993 | Slotkowski et al. |
| 5,184,956 A | 2/1993 | Langlais et al. |
| 5,189,561 A | 2/1993 | Hong |
| 5,193,000 A | 3/1993 | Lipton et al. |
| 5,193,029 A | 3/1993 | Schofield et al. |
| 5,204,778 A | 4/1993 | Bechtel |
| 5,208,701 A | 5/1993 | Maeda |
| 5,245,422 A | 9/1993 | Borcherts et al. |

(56) References Cited

U.S. PATENT DOCUMENTS

| | | |
|---|---|---|
| 5,253,109 A | 10/1993 | O'Farrell et al. |
| 5,276,389 A | 1/1994 | Levers |
| 5,285,060 A | 2/1994 | Larson et al. |
| 5,289,182 A | 2/1994 | Brillard et al. |
| 5,289,321 A | 2/1994 | Secor |
| 5,305,012 A | 4/1994 | Faris |
| 5,307,136 A | 4/1994 | Saneyoshi |
| 5,309,137 A | 5/1994 | Kajiwara |
| 5,313,072 A | 5/1994 | Vachss |
| 5,325,096 A | 6/1994 | Pakett |
| 5,325,386 A | 6/1994 | Jewell et al. |
| 5,329,206 A | 7/1994 | Slotkowski et al. |
| 5,331,312 A | 7/1994 | Kudoh |
| 5,336,980 A | 8/1994 | Levers |
| 5,341,437 A | 8/1994 | Nakayama |
| 5,351,044 A | 9/1994 | Mathur et al. |
| 5,355,118 A | 10/1994 | Fukuhara |
| 5,374,852 A | 12/1994 | Parkes |
| 5,386,285 A | 1/1995 | Asayama |
| 5,394,333 A | 2/1995 | Kao |
| 5,406,395 A | 4/1995 | Wilson et al. |
| 5,410,346 A | 4/1995 | Saneyoshi et al. |
| 5,414,257 A | 5/1995 | Stanton |
| 5,414,461 A | 5/1995 | Kishi et al. |
| 5,416,313 A | 5/1995 | Larson et al. |
| 5,416,318 A | 5/1995 | Hegyi |
| 5,416,478 A | 5/1995 | Morinaga |
| 5,424,952 A | 6/1995 | Asayama |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,457,493 A | 10/1995 | Leddy et al. |
| 5,461,357 A | 10/1995 | Yoshioka et al. |
| 5,461,361 A | 10/1995 | Moore |
| 5,469,298 A | 11/1995 | Suman et al. |
| 5,471,515 A | 11/1995 | Fossum et al. |
| 5,475,494 A | 12/1995 | Nishida et al. |
| 5,487,116 A | 1/1996 | Nakano et al. |
| 5,498,866 A | 3/1996 | Bendicks et al. |
| 5,500,766 A | 3/1996 | Stonecypher |
| 5,510,983 A | 4/1996 | Iino |
| 5,515,448 A | 5/1996 | Nishitani |
| 5,521,633 A | 5/1996 | Nakajima et al. |
| 5,528,698 A | 6/1996 | Kamei et al. |
| 5,529,138 A | 6/1996 | Shaw et al. |
| 5,530,240 A | 6/1996 | Larson et al. |
| 5,530,420 A | 6/1996 | Tsuchiya et al. |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A | 8/1996 | Schofield et al. |
| 5,555,312 A | 9/1996 | Shima et al. |
| 5,555,555 A | 9/1996 | Sato et al. |
| 5,568,027 A | 10/1996 | Teder |
| 5,574,443 A | 11/1996 | Hsieh |
| 5,581,464 A | 12/1996 | Woll et al. |
| 5,594,222 A | 1/1997 | Caldwell |
| 5,614,788 A | 3/1997 | Mullins |
| 5,619,370 A | 4/1997 | Guinosso |
| 5,634,709 A | 6/1997 | Iwama |
| 5,642,299 A | 6/1997 | Hardin et al. |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Teder |
| 5,666,028 A | 9/1997 | Bechtel et al. |
| 5,668,663 A | 9/1997 | Varaprasad et al. |
| 5,670,935 A | 9/1997 | Schofield et al. |
| 5,675,489 A | 10/1997 | Pomerleau |
| 5,677,851 A | 10/1997 | Kingdon et al. |
| 5,699,044 A | 12/1997 | Van Lente et al. |
| 5,724,187 A | 3/1998 | Varaprasad et al. |
| 5,724,316 A | 3/1998 | Brunts |
| 5,737,226 A | 4/1998 | Olson et al. |
| 5,757,949 A | 5/1998 | Kinoshita et al. |
| 5,760,826 A | 6/1998 | Nayar |
| 5,760,828 A | 6/1998 | Cortes |
| 5,760,931 A | 6/1998 | Saburi et al. |
| 5,760,962 A | 6/1998 | Schofield et al. |
| 5,761,094 A | 6/1998 | Olson et al. |
| 5,765,116 A | 6/1998 | Wilson-Jones et al. |
| 5,781,437 A | 7/1998 | Wiemer et al. |
| 5,786,772 A | 7/1998 | Schofield et al. |
| 5,790,403 A | 8/1998 | Nakayama |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,798,575 A | 8/1998 | O'Farrell et al. |
| 5,835,255 A | 11/1998 | Miles |
| 5,837,994 A | 11/1998 | Stam et al. |
| 5,844,505 A | 12/1998 | Van Ryzin |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,370 A | 3/1999 | Olson |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mori et al. |
| 5,899,956 A | 5/1999 | Chan |
| 5,914,815 A | 6/1999 | Bos |
| 5,923,027 A | 7/1999 | Stam et al. |
| 5,929,786 A | 7/1999 | Schofield et al. |
| 5,940,120 A | 8/1999 | Frankhouse et al. |
| 5,949,331 A | 9/1999 | Schofield et al. |
| 5,956,181 A | 9/1999 | Lin |
| 5,959,367 A | 9/1999 | O'Farrell et al. |
| 5,959,555 A | 9/1999 | Furuta |
| 5,963,247 A | 10/1999 | Banitt |
| 5,964,822 A | 10/1999 | Alland et al. |
| 5,971,552 A | 10/1999 | O'Farrell et al. |
| 5,986,796 A | 11/1999 | Miles |
| 5,990,469 A | 11/1999 | Bechtel et al. |
| 5,990,649 A | 11/1999 | Nagao et al. |
| 6,001,486 A | 12/1999 | Varaprasad et al. |
| 6,009,336 A | 12/1999 | Harris et al. |
| 6,020,704 A | 2/2000 | Buschur |
| 6,049,171 A | 4/2000 | Stam et al. |
| 6,066,933 A | 5/2000 | Ponziana |
| 6,084,519 A | 7/2000 | Coulling et al. |
| 6,087,953 A | 7/2000 | DeLine et al. |
| 6,097,023 A | 8/2000 | Schofield et al. |
| 6,097,024 A | 8/2000 | Stam et al. |
| 6,116,743 A | 9/2000 | Hoek |
| 6,124,647 A | 9/2000 | Marcus et al. |
| 6,124,886 A | 9/2000 | DeLine et al. |
| 6,139,172 A | 10/2000 | Bos et al. |
| 6,144,022 A | 11/2000 | Tenenbaum et al. |
| 6,172,613 B1 | 1/2001 | DeLine et al. |
| 6,175,164 B1 | 1/2001 | O'Farrell et al. |
| 6,175,300 B1 | 1/2001 | Kendrick |
| 6,198,409 B1 | 3/2001 | Schofield et al. |
| 6,201,642 B1 | 3/2001 | Bos |
| 6,222,447 B1 | 4/2001 | Schofield et al. |
| 6,222,460 B1 | 4/2001 | DeLine et al. |
| 6,243,003 B1 | 6/2001 | DeLine et al. |
| 6,250,148 B1 | 6/2001 | Lynam |
| 6,259,412 B1 | 7/2001 | Duroux |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,291,906 B1 | 9/2001 | Marcus et al. |
| 6,294,989 B1 | 9/2001 | Schofield et al. |
| 6,297,781 B1 | 10/2001 | Turnbull et al. |

(56) References Cited

U.S. PATENT DOCUMENTS

| | | |
|---|---|---|
| 6,302,545 B1 | 10/2001 | Schofield et al. |
| 6,310,611 B1 | 10/2001 | Caldwell |
| 6,313,454 B1 | 11/2001 | Bos et al. |
| 6,317,057 B1 | 11/2001 | Lee |
| 6,320,176 B1 | 11/2001 | Schofield et al. |
| 6,320,282 B1 | 11/2001 | Caldwell |
| 6,326,613 B1 | 12/2001 | Heslin et al. |
| 6,329,925 B1 | 12/2001 | Skiver et al. |
| 6,333,759 B1 | 12/2001 | Mazzilli |
| 6,341,523 B2 | 1/2002 | Lynam |
| 6,353,392 B1 | 3/2002 | Schofield et al. |
| 6,366,213 B2 | 4/2002 | DeLine et al. |
| 6,370,329 B1 | 4/2002 | Teuchert |
| 6,396,397 B1 | 5/2002 | Bos et al. |
| 6,411,204 B1 | 6/2002 | Bloomfield et al. |
| 6,411,328 B1 | 6/2002 | Franke et al. |
| 6,420,975 B1 | 7/2002 | DeLine et al. |
| 6,424,273 B1 | 7/2002 | Gutta et al. |
| 6,428,172 B1 | 8/2002 | Hutzel et al. |
| 6,430,303 B1 | 8/2002 | Naoi et al. |
| 6,433,676 B2 | 8/2002 | DeLine et al. |
| 6,433,817 B1 | 8/2002 | Guerra |
| 6,442,465 B2 | 8/2002 | Breed et al. |
| 6,477,464 B2 | 11/2002 | McCarthy et al. |
| 6,485,155 B1 | 11/2002 | Duroux et al. |
| 6,497,503 B1 | 12/2002 | Dassanayake et al. |
| 6,498,620 B2 | 12/2002 | Schofield et al. |
| 6,513,252 B1 | 2/2003 | Schierbeek |
| 6,516,664 B2 | 2/2003 | Lynam |
| 6,523,964 B2 | 2/2003 | Schofield et al. |
| 6,534,884 B2 | 3/2003 | Marcus et al. |
| 6,539,306 B2 | 3/2003 | Turnbull |
| 6,547,133 B1 | 4/2003 | Devries, Jr. et al. |
| 6,553,130 B1 | 4/2003 | Lemelson et al. |
| 6,559,435 B2 | 5/2003 | Schofield et al. |
| 6,559,761 B1 | 5/2003 | Miller et al. |
| 6,574,033 B1 | 6/2003 | Chui et al. |
| 6,578,017 B1 | 6/2003 | Ebersole et al. |
| 6,587,573 B1 | 7/2003 | Stam et al. |
| 6,589,625 B1 | 7/2003 | Kothari et al. |
| 6,593,565 B2 | 7/2003 | Heslin et al. |
| 6,594,583 B2 | 7/2003 | Ogura et al. |
| 6,611,202 B2 | 8/2003 | Schofield et al. |
| 6,611,610 B1 | 8/2003 | Stam et al. |
| 6,627,918 B2 | 9/2003 | Getz et al. |
| 6,631,994 B2 | 10/2003 | Suzuki et al. |
| 6,636,258 B2 | 10/2003 | Strumolo |
| 6,648,477 B2 | 11/2003 | Hutzel et al. |
| 6,650,233 B2 | 11/2003 | DeLine et al. |
| 6,650,455 B2 | 11/2003 | Miles |
| 6,672,731 B2 | 1/2004 | Schnell et al. |
| 6,674,562 B1 | 1/2004 | Miles |
| 6,678,056 B2 | 1/2004 | Downs |
| 6,678,614 B2 | 1/2004 | McCarthy et al. |
| 6,680,792 B2 | 1/2004 | Miles |
| 6,690,268 B2 | 2/2004 | Schofield et al. |
| 6,700,605 B1 | 3/2004 | Toyoda et al. |
| 6,703,925 B2 | 3/2004 | Steffel |
| 6,704,621 B1 | 3/2004 | Stein et al. |
| 6,710,908 B2 | 3/2004 | Miles et al. |
| 6,711,474 B1 | 3/2004 | Treyz et al. |
| 6,714,331 B2 | 3/2004 | Lewis et al. |
| 6,717,610 B1 | 4/2004 | Bos et al. |
| 6,721,659 B2 | 4/2004 | Stopczynski |
| 6,735,506 B2 | 5/2004 | Breed et al. |
| 6,741,377 B2 | 5/2004 | Miles |
| 6,744,353 B2 | 6/2004 | Sjonell |
| 6,757,109 B2 | 6/2004 | Bos |
| 6,762,867 B2 | 7/2004 | Lippert et al. |
| 6,794,119 B2 | 9/2004 | Miles |
| 6,795,221 B1 | 9/2004 | Urey |
| 6,802,617 B2 | 10/2004 | Schofield et al. |
| 6,806,452 B2 | 10/2004 | Bos et al. |
| 6,822,563 B2 | 11/2004 | Bos et al. |
| 6,823,241 B2 | 11/2004 | Shirato et al. |
| 6,824,281 B2 | 11/2004 | Schofield et al. |
| 6,831,261 B2 | 12/2004 | Schofield et al. |
| 6,847,487 B2 | 1/2005 | Burgner |
| 6,882,287 B2 | 4/2005 | Schofield |
| 6,889,161 B2 | 5/2005 | Winner et al. |
| 6,891,563 B2 | 5/2005 | Schofield et al. |
| 6,909,753 B2 | 6/2005 | Meehan et al. |
| 6,946,978 B2 | 9/2005 | Schofield |
| 6,953,253 B2 | 10/2005 | Schofield et al. |
| 6,968,736 B2 | 11/2005 | Lynam |
| 6,975,775 B2 | 12/2005 | Rykowski et al. |
| 7,004,593 B2 | 2/2006 | Weller et al. |
| 7,004,606 B2 | 2/2006 | Schofield |
| 7,005,974 B2 | 2/2006 | McMahon et al. |
| 7,038,577 B2 | 5/2006 | Pawlicki et al. |
| 7,046,448 B2 | 5/2006 | Burgner |
| 7,062,300 B1 | 6/2006 | Kim |
| 7,065,432 B2 | 6/2006 | Moisei et al. |
| 7,085,637 B2 | 8/2006 | Breed et al. |
| 7,092,548 B2 | 8/2006 | Laumeyer et al. |
| 7,116,246 B2 | 10/2006 | Winter et al. |
| 7,123,168 B2 | 10/2006 | Schofield |
| 7,133,661 B2 | 11/2006 | Hatae et al. |
| 7,149,613 B2 | 12/2006 | Stam et al. |
| 7,158,015 B2 | 1/2007 | Rao et al. |
| 7,167,796 B2 | 1/2007 | Taylor et al. |
| 7,195,381 B2 | 3/2007 | Lynam et al. |
| 7,202,776 B2 | 4/2007 | Breed |
| 7,224,324 B2 | 5/2007 | Quist et al. |
| 7,227,459 B2 | 6/2007 | Bos et al. |
| 7,227,611 B2 | 6/2007 | Hull et al. |
| 7,249,860 B2 | 7/2007 | Kulas et al. |
| 7,253,723 B2 | 8/2007 | Lindahl et al. |
| 7,255,451 B2 | 8/2007 | McCabe et al. |
| 7,311,406 B2 | 12/2007 | Schofield et al. |
| 7,325,934 B2 | 2/2008 | Schofield et al. |
| 7,325,935 B2 | 2/2008 | Schofield et al. |
| 7,338,177 B2 | 3/2008 | Lynam |
| 7,339,149 B1 | 3/2008 | Schofield et al. |
| 7,344,261 B2 | 3/2008 | Schofield et al. |
| 7,360,932 B2 | 4/2008 | Uken et al. |
| 7,370,983 B2 | 5/2008 | DeWind et al. |
| 7,375,803 B1 | 5/2008 | Bamji |
| 7,380,948 B2 | 6/2008 | Schofield et al. |
| 7,388,182 B2 | 6/2008 | Schofield et al. |
| 7,402,786 B2 | 7/2008 | Schofield et al. |
| 7,423,248 B2 | 9/2008 | Schofield et al. |
| 7,423,821 B2 | 9/2008 | Bechtel et al. |
| 7,425,076 B2 | 9/2008 | Schofield et al. |
| 7,459,664 B2 | 12/2008 | Schofield et al. |
| 7,483,058 B1 | 1/2009 | Frank et al. |
| 7,526,103 B2 | 4/2009 | Schofield et al. |
| 7,541,743 B2 | 6/2009 | Salmeen et al. |
| 7,561,181 B2 | 7/2009 | Schofield et al. |
| 7,565,006 B2 | 7/2009 | Stam et al. |
| 7,616,781 B2 | 11/2009 | Schofield et al. |
| 7,619,508 B2 | 11/2009 | Lynam et al. |
| 7,633,383 B2 | 12/2009 | Dunsmoir et al. |
| 7,639,149 B2 | 12/2009 | Katoh |
| 7,676,087 B2 | 3/2010 | Dhua et al. |
| 7,690,737 B2 | 4/2010 | Lu |
| 7,720,580 B2 | 5/2010 | Higgins-Luthman |
| 7,792,329 B2 | 9/2010 | Schofield et al. |
| 7,843,451 B2 | 11/2010 | Lafon |
| 7,855,778 B2 | 12/2010 | Yung et al. |
| 7,859,565 B2 | 12/2010 | Schofield et al. |
| 7,881,496 B2 | 2/2011 | Camilleri et al. |
| 7,914,187 B2 | 3/2011 | Higgins-Luthman et al. |
| 7,930,160 B1 | 4/2011 | Hosagrahara et al. |
| 8,017,898 B2 | 9/2011 | Lu et al. |
| 8,094,170 B2 | 1/2012 | Kato et al. |
| 8,095,310 B2 | 1/2012 | Taylor et al. |
| 8,098,142 B2 | 1/2012 | Schofield et al. |
| 8,138,899 B2 | 3/2012 | Ghneim |
| 8,224,031 B2 | 7/2012 | Saito |
| 9,495,876 B2 | 11/2016 | Lu et al. |
| 10,106,155 B2 | 10/2018 | Lu et al. |
| 10,875,526 B2 | 12/2020 | Lu et al. |
| 2001/0001563 A1 | 5/2001 | Tomaszewski |

(56) References Cited

U.S. PATENT DOCUMENTS

| | | |
|---|---|---|
| 2002/0113873 A1 | 8/2002 | Williams |
| 2003/0021490 A1 | 1/2003 | Okamoto et al. |
| 2003/0137586 A1 | 7/2003 | Lewellen |
| 2003/0222982 A1 | 12/2003 | Hamdan et al. |
| 2004/0008410 A1* | 1/2004 | Stam .................. G02B 1/11 359/443 |
| 2005/0219852 A1 | 10/2005 | Stam et al. |
| 2005/0237385 A1 | 10/2005 | Kosaka et al. |
| 2006/0018511 A1 | 1/2006 | Stam et al. |
| 2006/0018512 A1 | 1/2006 | Stam et al. |
| 2006/0050018 A1 | 3/2006 | Hutzel et al. |
| 2006/0091813 A1 | 5/2006 | Stam et al. |
| 2006/0103727 A1 | 5/2006 | Tseng |
| 2006/0250501 A1 | 11/2006 | Wildmann et al. |
| 2007/0088474 A1* | 4/2007 | Sugiura .................. B60R 1/00 348/148 |
| 2007/0104476 A1 | 5/2007 | Yasutomi et al. |
| 2007/0109406 A1 | 5/2007 | Schofield et al. |
| 2007/0120657 A1 | 5/2007 | Schofield et al. |
| 2007/0154068 A1 | 7/2007 | Stein et al. |
| 2007/0242339 A1 | 10/2007 | Bradley |
| 2008/0147321 A1 | 6/2008 | Howard et al. |
| 2008/0180526 A1 | 7/2008 | Trevino |
| 2008/0192132 A1 | 8/2008 | Bechtel et al. |
| 2008/0231701 A1 | 9/2008 | Greenwood et al. |
| 2009/0079828 A1 | 3/2009 | Lee et al. |
| 2009/0113509 A1 | 4/2009 | Tseng et al. |
| 2009/0143967 A1 | 6/2009 | Lee et al. |
| 2009/0160987 A1 | 6/2009 | Bechtel et al. |
| 2009/0190015 A1 | 7/2009 | Bechtel et al. |
| 2009/0236825 A1 | 9/2009 | Okuda et al. |
| 2009/0256938 A1 | 10/2009 | Bechtel et al. |
| 2010/0014770 A1 | 1/2010 | Huggett et al. |
| 2010/0085170 A1 | 4/2010 | Oleg |
| 2010/0110189 A1 | 5/2010 | Kuboyama et al. |
| 2010/0118169 A1 | 5/2010 | Yu et al. |
| 2010/0253597 A1* | 10/2010 | Seder .................. G08G 1/166 348/148 |
| 2010/0324770 A1 | 12/2010 | Ramsey et al. |
| 2012/0045112 A1 | 2/2012 | Lundblad et al. |

FOREIGN PATENT DOCUMENTS

| | | |
|---|---|---|
| EP | 0788947 A1 | 8/1997 |
| JP | 59114139 | 7/1984 |
| JP | 6080953 | 5/1985 |
| JP | 6079889 | 10/1986 |
| JP | 6272245 | 5/1987 |
| JP | 6414700 | 1/1989 |
| JP | 4114587 B2 | 4/1992 |
| JP | 0577657 | 3/1993 |
| JP | 05050883 | 3/1993 |
| JP | 5213113 | 8/1993 |
| JP | 6227318 B2 | 8/1994 |
| JP | 06267304 | 9/1994 |
| JP | 06276524 | 9/1994 |
| JP | 06295601 | 10/1994 |
| JP | 07004170 | 1/1995 |
| JP | 0732936 | 2/1995 |
| JP | 0747878 | 2/1995 |
| JP | 07052706 | 2/1995 |
| JP | 0769125 | 3/1995 |
| JP | 07105496 | 4/1995 |
| JP | 2630604 | 7/1997 |
| JP | 200383742 A | 3/2003 |
| WO | 2009/004907 A1 | 1/2009 |
| WO | 2009036176 A1 | 3/2009 |

OTHER PUBLICATIONS

Tokimaru et al., "CMOS Rear-View TV System with CCD Camera", National Technical Report vol. 34, No. 3, pp. 329-336, Jun. 1988 (Japan).

Reexamination Control No. 90/007,519, Reexamination of U.S. Pat. No. 6,222,447, issued to Schofield et al.

Reexamination Control No. 90/007,520, Reexamination of U.S. Pat. No. 5,949,331, issued to Schofield et al.

Reexamination Control No. 90/011,478, Reexamination of U.S. Pat. No. 6,222,447, issued to Schofield et al.

Reexamination Control No. 90/011,477, Reexamination of U.S. Pat. No. 5,949,331, issued to Schofield et al.

J. Borenstein et al., "Where am I? Sensors and Method for Mobile Robot Positioning", University of Michigan, Apr. 1996, pp. 2, 125-128.

Bow, Sing T., "Pattern Recognition and Image Preprocessing (Signal Processing and Communications)", CRC Press, Jan. 15, 2002, pp. 557-559.

Vlacic et al. (Eds), "Intelligent Vehicle Tecnologies, Theory and Applications", Society of Automotive Engineers Inc., edited by SAE International, 2001.

Van Leuven et al., "Real-Time Vehicle Tracking in Image Sequences", IEEE, US, vol. 3, May 21, 2001, pp. 2049-2054, XP010547308.

Van Leeuwen et al., "Requirements for Motion Estimation in Image Sequences for Traffic Applications", IEEE, US, vol. 1, May 24, 1999, pp. 145-150, XP010340272.

Van Leeuwen et al., "Motion Estimation with a Mobile Camera for Traffic Applications", IEEE, US, vol. 1, Oct. 3, 2000, pp. 58-63.

Van Leeuwen et al., "Motion Interpretation for In-Car Vision Systems", IEEE, US, vol. 1, Sep. 30, 2002, p. 135-140.

Pratt, "Digital Image Processing, Passage—ED.3", John Wiley & Sons, US, Jan. 1, 2001, pp. 657-659, XP002529771.

International Search Report and Written Opinion for corresponding PCT Application No. PCT/US2010/043363.

* cited by examiner

| Frequency (Hz) | Power Spectrum Density (m/s$^2$)$^2$/Hz |
|---|---|
| 10 | 20 |
| 55 | 6.5 |
| 180 | 0.25 |
| 300 | 0.25 |
| 360 | 0.14 |
| 1000 | 0.14 |

No Distortion Correction

Optical Correction

Electronic Correction

VEHICULAR VISION SYSTEM

CROSS REFERENCE TO RELATED APPLICATIONS

The present application is a continuation of U.S. patent application Ser. No. 16/166,325, filed Oct. 22, 2018, now U.S. Pat. No. 10,875,526, which is a continuation of U.S. patent application Ser. No. 15/349,011, filed Nov. 11, 2016, now U.S. Pat. No. 10,106,155, which is a divisional application of U.S. patent application Ser. No. 13/384,673, filed Jun. 27, 2012, now U.S. Pat. No. 9,495,876, which is a 371 national phase filing of PCT Application No. PCT/US2010/043363, filed Jul. 27, 2010, which claims the filing benefit of U.S. provisional application Ser. No. 61/228,659, filed Jul. 27, 2009, which are hereby incorporated herein by reference in their entireties.

FIELD OF THE INVENTION

The present invention relates to a camera for use in vehicles, and more particularly rearview cameras for use in vehicles.

BACKGROUND OF THE INVENTION

A typical camera for mounting on a vehicle has a lens member, an imaging element, a circuit board and housing members that connect together. The typical vehicular camera, however, is relatively restricted in terms of its processing capabilities.

SUMMARY OF THE INVENTION

In one aspect of the invention, a vehicular camera is provided, comprising a lens, a housing, an imager and a microcontroller that is capable of handling certain functions, such as applying overlays to images received by the imager, dewarping the image and/or providing different viewing modes.

In a first aspect, the invention is directed to a vehicular camera, comprising a lens, a housing, an imager and a microcontroller that is capable of handling certain functions, such as controlling the application of overlays to images received by the imager, dewarping the image and/or providing different viewing modes.

In a second aspect, the invention is directed to vehicles and/or vehicular systems that incorporate the aforementioned camera. Such systems include, for example, vehicle surround view systems and object detection/collision avoidance systems.

In a third aspect, the invention is directed to a vehicular camera, comprising a lens, an image processor and a microcontroller. The microcontroller is connected to the image processor by a first bus through which command data is communicated to the image processor from the microcontroller. The command data includes application instructions to draw application data from a selected point in the flash memory. The microcontroller is connected to the image processor by a second bus through which application data is communicated to the image processor from the flash memory.

In a fourth aspect, the invention is directed to a vehicular camera that dewarps an image by stretching and compressing portions of the image so as to provide a selected shape to a selected known element in the raw image received by the camera. For example, the camera may be configured to dewarp images based on the shape of the horizon line in the images. In the raw images received by the camera the horizon line may be curved instead of being straight as it should be if there were no warpage in the raw images. The camera will stretch and compress portions of the image in order to at least partially straighten out the horizon line thereby dewarping the image.

In a particular embodiment, the camera includes a lens having a field of view, an image sensor, a housing and a controller. The lens and image sensor are mounted to the housing at a selected position relative to each other. The imager receives raw images from the lens. For at least one raw image the controller is programmed to generate a dewarped image by stretching and compressing portions of the raw image so as to provide in the dewarped image a selected shape for a selected known element in the field of view of the lens.

In a fifth aspect, the invention is directed to a camera system for a vehicle, including a camera, a distance sensor, and a controller that determines whether there is an element in the fields of view of the camera and the distance sensor that represents a collision risk for the vehicle based on an image from the camera and input from the distance sensor. Upon detection of an element that represents a collision risk the controller is programmed to carry out at least one action consisting of: informing the driver of the vehicle of the collision risk; and control at least one vehicle component to inhibit a collision by the vehicle with the element that represents a collision risk.

In a sixth aspect, the invention is directed to a camera system for a vehicle, including a plurality of cameras each of which is connected to a central controller by an electrical cable. Each camera has sufficient individual processing capacity to be able to modify raw images and generate processed images. The processed images are sent to the central controller, which combines the images into a single image which shows the combined field of view of the plurality of cameras, and which may optionally apply an overlay to the single image. Because each camera has sufficient processing capacity to modify the raw images, a relatively inexpensive type of electrical cable can be used to transmit the images from the cameras to the central controller. By contrast, in some prior art systems, the cameras are not capable of modifying the images and so typically expensive, well-insulated cable (e.g., coaxial cable) is used to transmit images from the camera to a central controller, which receives the images and carries out functions, such as dewarping functions, on the images. The coaxial cables, however, are relatively expensive, and are difficult to route easily through the vehicle due to their thickness and consequent low flexibility.

In a particular embodiment, the camera system includes four cameras. The cameras are positioned at selected positions about the vehicle such that the combined field of view of the four cameras is substantially 360 degrees. Each camera includes a lens, an image sensor, a housing and a controller. The lens and image sensor are mounted to the housing at a selected position relative to each other. The image sensor receives raw images from the lens. The controller is programmed to modify at least one raw image to produce a processed image. The central controller is programmed to combine the processed images from the cameras into a single combined image showing the combined field of view.

In a seventh aspect, the invention is directed to a camera for a vehicle having a towing device, including a lens having a field of view, an image sensor, a housing and a controller that processes raw images received by the image sensor into processed images. The camera is positioned at an actual viewing angle and has the towing device is in the field of view of the lens. The camera has a bird's eye viewing mode in which the controller is programmed to modify the raw image so that the processed image appears to have been taken at an apparent viewing angle that is more vertically oriented than the actual viewing angle.

In an eighth aspect, the invention is directed to a camera for a vehicle. The camera is programmed to recognize a selected feature in its field of view and to apply an overlay proximate the selected feature in an initial raw image showing the selected feature. As the vehicle moves, and the selected feature moves in the field of view of the camera, the camera holds the overlay in a fixed position, so that the selected feature moves relative to the overlay. This can be used for several purposes. One purpose in particular is to assist the vehicle driver in backing up the vehicle when towing a trailer. The selected feature would be provided on the trailer (e.g., a sign with a cross-hairs on it). Initially, when the driver has the trailer directly behind the vehicle, the camera could be activated by the driver to apply an overlay to the raw image showing the cross-hairs. The overlay could be, for example, a dot at the center of the cross-hairs. As the driver backs up the vehicle and trailer, the cross-hairs on the trailer will move relative to the fixed dot on the screen if the trailer begins to turn at an angle relative to the vehicle. Thus, the driver can use the dot and the cross-hairs as a reference to keep the vehicle and the trailer straight while backing up.

BRIEF DESCRIPTION OF THE DRAWINGS

The present invention will now be described by way of example only with reference to the attached drawings, in which.

DETAILED DESCRIPTION OF THE INVENTION

Figure 1:
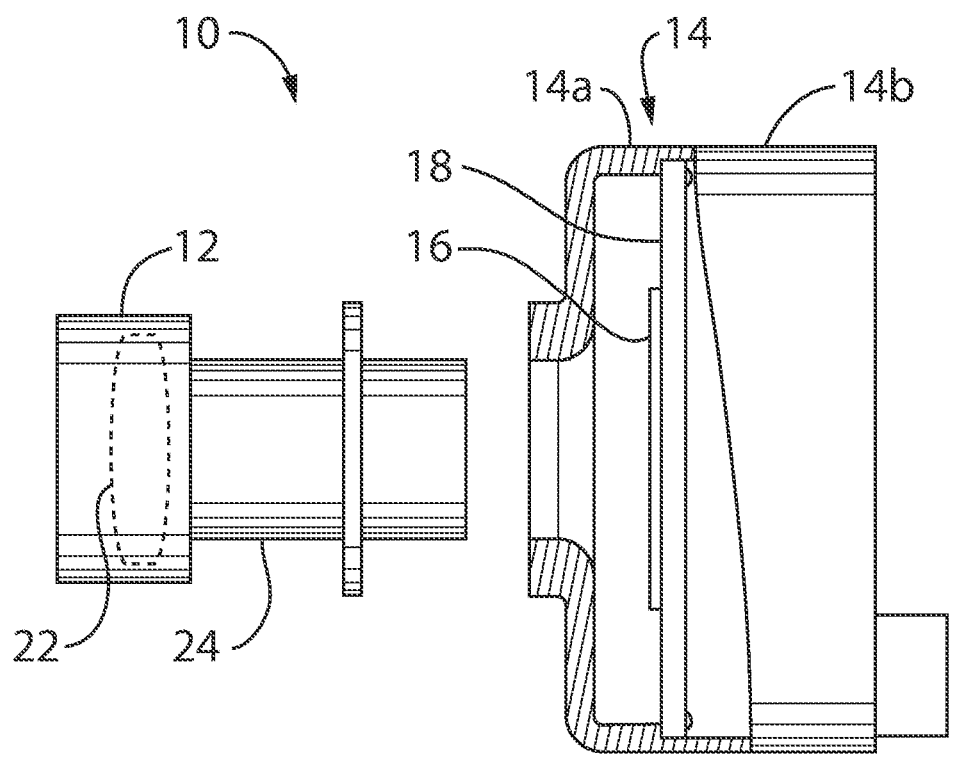
FIG. 1 is a schematic illustration of a camera in accordance with an embodiment of the present invention.
Figure 1A:
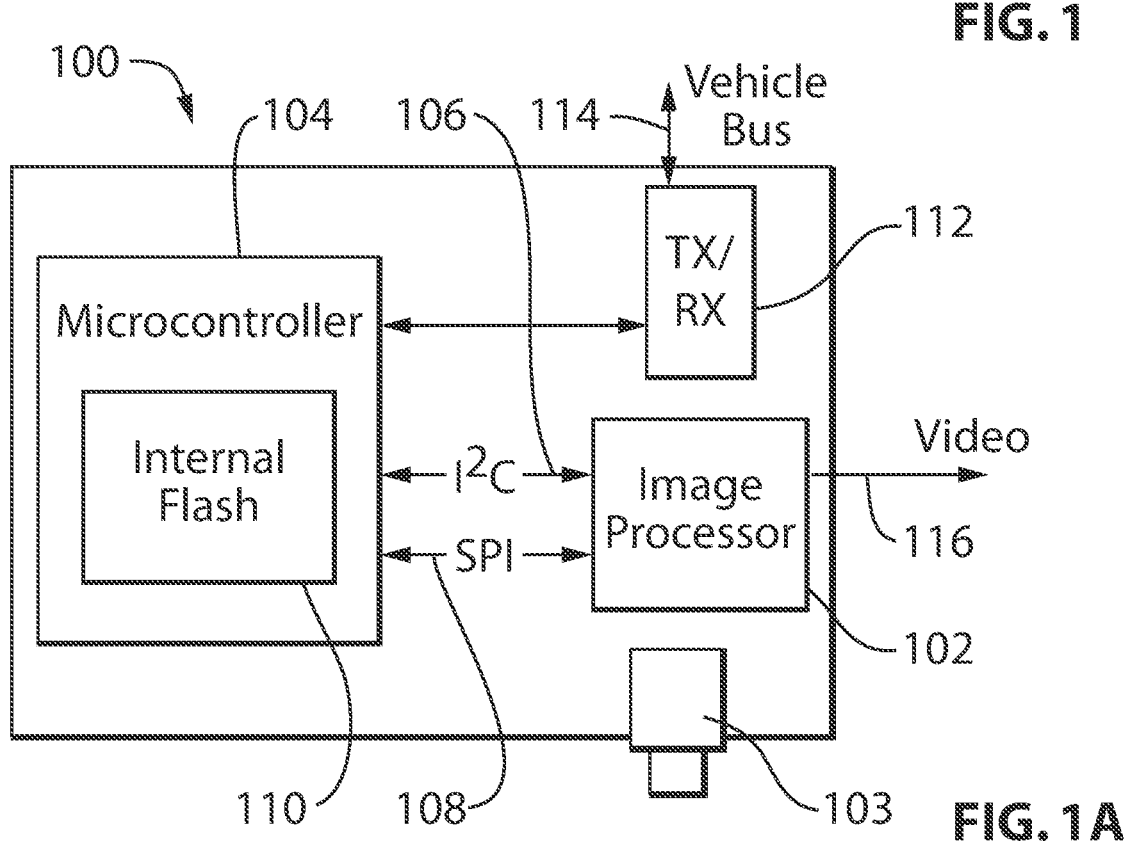
FIG. 1A is a schematic of a camera in accordance with an embodiment of the present invention, illustrating electrical components associated with the camera.

FIG. 1A is a system block diagram of a camera system 100 which includes an image processor 102 operatively connected to a camera lens 103 (as discussed in greater detail below) and a microcontroller 104. In the preferred embodiment the image processor 102 is a model MT9V126 which includes a CMOS image sensor and some control elements and is available from Aptina Imaging, San Jose, Calif., and the microcontroller 104 is a PIC microcontroller available from Microchip Technology, Chandler, Ariz., and which includes an internal flash memory 110. The image processor 102 and microcontroller 104 communicate via a serial, two wire, inter-integrated circuit (I$^2$C) bus 106, as known in the art per se. The image processor 102 and microcontroller 104 also communicate via a four wire serial peripheral interface (SPI) bus 108, as known in the art per se. The system 100 also includes a transceiver 112 that enables the microcontroller 104 to communicate with other devices over the vehicle internal bus 114 such as a CAN or LIN bus as known in the art per se. The image processor 102 provides a composite video output 116, such as a single ended or differential NTSC or PAL signal.

In an embodiment not shown in FIG. 1A, the image processor SPI bus is used to connect to an external flash memory device that stores overlay data to be superimposed on the images obtained from the camera lens 103. In the embodiment shown in FIG. 1A, the SPI bus 108 is directly connected to the microcontroller 104, which includes I/O pins (not shown) and appropriate interface circuitry for implementing the SPI bus protocol, all under control of the microcontroller. The SPI protocol provides for the reading or writing to a block of memory, commencing from a memory address. Thus, the microcontroller 104 is able to emulate a flash device, providing data from its internal flash 110, or dynamically calculating and providing imager data such as overlay data to the internal SPI bus registers for transfer to the image processor 102. Thus, overlay data can be dynamically calculated on the fly. This provides an advantage over the prior art where conventionally, the overlay data had to be pre-programmed or pre-considered to account for all eventualities. For example, in an application which superimposes a square block at any point in the image to represent a moving object, the prior art required that the flash memory be pre-programmed with a series of blocks that covered the entire display area, to thus mimic the movement of the block. This can be avoided by dynamic overlay data generation by the microcontroller 104. For example, the microcontroller 104 may be programmed to calculate at least one of the size and shape of an overlay, to store the calculated shape of the overlay in its flash memory 110 and to transmit data relating to the overlay to the image processor 102 for the image processor 102 to apply to one or more images.

The I2C bus 106 is used by the microcontroller 104 to send command data to the image processor 102, including for example memory instructions for where to draw application data including for example, overlay data. The SPI bus 108 is used to communicate the application data between the microcontroller 104 and the image processor (specifically between the flash memory 110 contained on the microcontroller 104 and the image processor 102).

The implementation of the emulated flash provides a convenient method for the camera system 100 to access imager-specific data, including custom image settings, overlays, and digital correction algorithms. The imager-specific data is organized into a series of records, including custom register settings sets, digital correction algorithms, overlays, and imager patches. Each record is organized into tables indexed by a table of contents. Each table is in turn indexed by a master table of contents. Furthermore, initialization tables are made available for custom initialization routines.

Thus, other advantages flowing from the invention includes the fact that flash drivers do not need to be developed to support an external device. Rather, the microcontroller has a means for performing flash-based operations on program memory. The bootloader also has reduced complexity as the microcontroller does not need to maintain a separate flash driver for an external flash. There are also a reduced number of physical connections/communication channels. With emulated flash, a single SPI communication channel exists between the microcontroller and image processor. With an external flash, an additional SPI connection between the microcontroller and external flash would be required, in order to allow for re-flashing.

Reference is made to FIG. 1, which shows a camera 10 in accordance with an embodiment of the present invention. The camera includes a lens assembly 12, a housing 14, which may include a lens holder 14a and a rear housing member 14b, an imager 16 and a microcontroller 18.

The lens assembly 12 is an assembly that includes a lens 22 and a lens barrel 24. The lens 22 may be held in the lens barrel 24 in any suitable way. The lens 22 preferably includes optical distortion correction features and is tailored to some extent for use as a rearview camera for a vehicle. The distance between the top of the lens 22 and the plane of the imager is preferably about 25 mm.

The lens barrel 24 may have either a threaded exterior wall or a threadless exterior wall. In embodiments wherein the exterior wall is threaded, the thread may be an M12x0.5 type thread. The barrel 24 is preferably made from Aluminum or plastic, however other materials of construction are also possible. The lens barrel 24 preferably has a glue flange thereon.

A lens retainer cap, if provided, preferably has a diameter of about 20 mm. The imager 16 is preferably a ¼ inch CMOS sensor with 640×480 pixels, with a pixel size of 5.6 micrometers×5.6 micrometers. The imager preferably has an active sensor area of 3.584 mm horizontal×2.688 mm vertical, which gives a diagonal length of 4.480 mm.

The field of view of the camera 10 may be about 123.4 degrees horizontally×about 100.0 degrees vertically, which gives a diagonal field of view of about 145.5 degrees. It will be understood that other fields of view are possible, and are described further below.

The F number of the lens is preferably about 2.0 or lower.

The relative illumination is preferably >about 50% inside an image circle having a diameter of about 4.480 mm.

The geometrical distortion is preferably better than about −47.

Figures 2, 3:
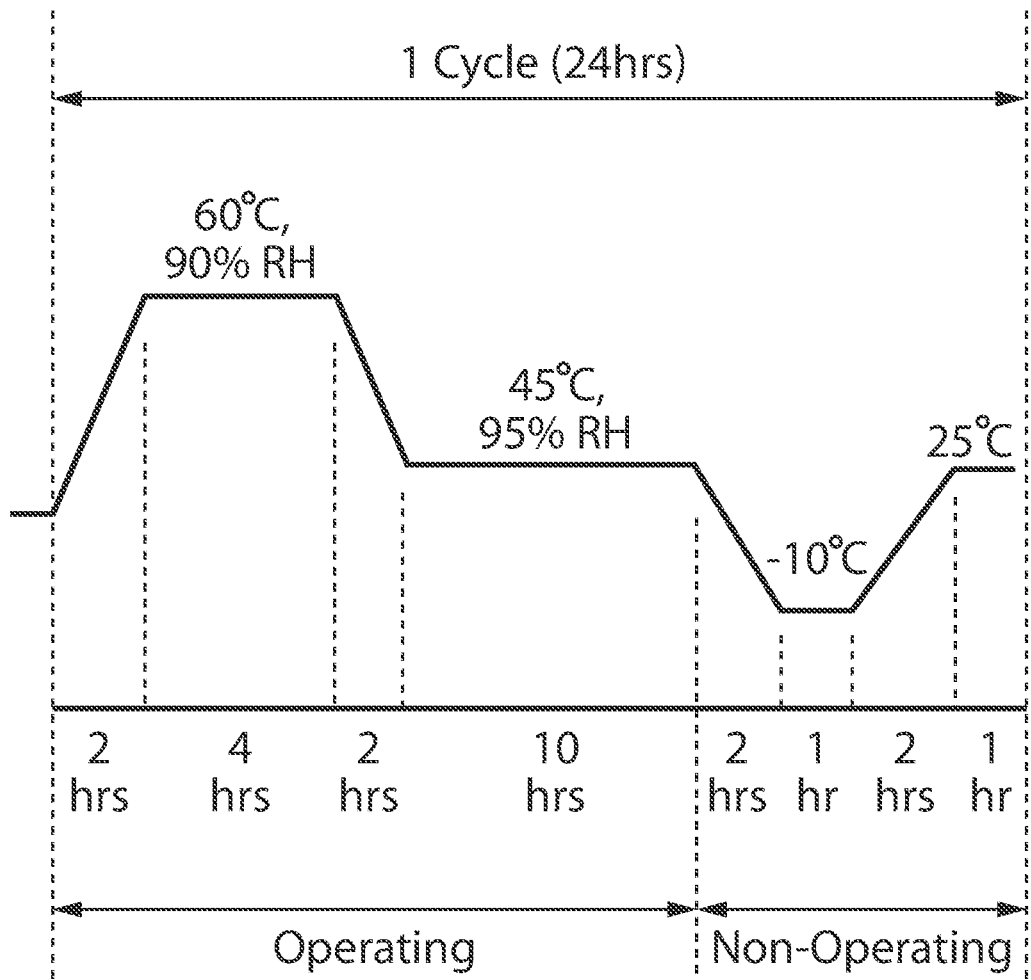
FIG. 2 is a graph showing temperature-related specifications for the camera shown in FIG. 1.
FIG. 3 is a table showing fatigue-related specifications for the camera shown in FIG. 1.
Figure 4:
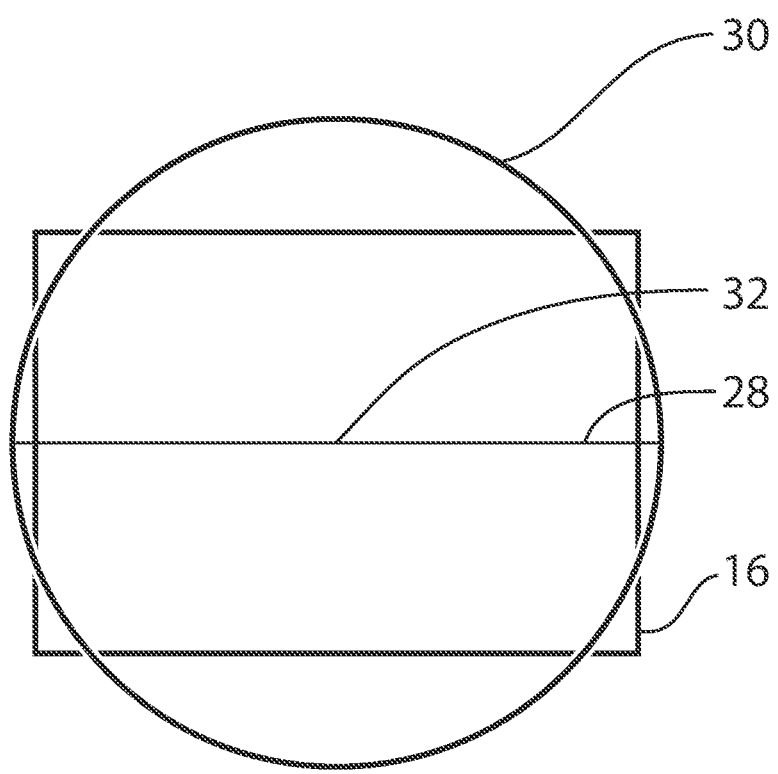
FIG. 4 is a view of the lens superimposed with the imager for the camera shown in FIG. 1.

The modulation transfer function (MTF) values for both tangential MTF and sagittal MTF are preferably greater than about 0.45 at 45 lp/mm on the lens axis, and greater than or equal to about 0.30 at 45 lp/mm off the camera axis between about 0 degrees and about 60 degrees. Exemplary curves for the MTF value at 0 degrees and at 60 degrees are shown in FIGS. 2a and 2b.

The lens 22 preferably has an integrated infrared cutoff filter. The filter can be directly coated on one of the lens elements. Alternatively, the filter can be an add-on thin glass element with the coating thereon. The pass-band wavelengths of the infrared cutoff filter may be about 410 nm for a low pass, and about 690 nm for a high pass.

The infrared cutoff filter preferably has at least about 85% transmission over the pass-band spectrum, and at least about 50% transmission at both 410 nm and 690 nm.

The lens 22 preferably has an anti-reflective coating on each surface of each lens element, except the surface with the infrared cutoff filter thereon and except any surfaces that are cemented to the lens barrel or to some other component.

The image circle diameter of the lens is preferably less than 4.80 mm. The angle between the optical axis of the lens 22 and the reference diameter axis for the barrel 24 is preferably less than 1.0 degrees.

Preferably, the lens 22 is substantially free from artificial optical effects, such as halo, veiling glare, lens flare and ghost images.

Preferably, the lens 22 has a hydrophobic coating on its outer surfaces, for repelling water and for providing a self-cleaning capability to the lens 22.

Preferably, the lens 22 is capable of withstanding the following conditions without any detrimental effects, such as peel-off, cracking, crazing, voids, bubbles of lens elements, dust/water/fluid ingress, moisture condensation, foreign objects, cropping of field, non-uniform image field and distortion that did not exist prior to the conditions, or any visible and irreversible change to the appearance of the lens 22 including color and surface smooth level, or any of the aforementioned lens properties changing outside a selected range.

The conditions to be withstood by the lens 22 include:
Subjecting the lens 22 to a temperature of anywhere from −40 degrees Celsius to 95 degrees Celsius;
Enduring 1000 hours at 95 degrees Celsius;
Cycling of the lens a selected number of times between −40 and 95 degrees Celsius, with a dwell time for the lens in each temperature of at least a selected period of time and a ramping time to reach one or the other temperature of less than another selected period of time;
Exposing the lens 22 to 85 degrees Celsius and 85% relative humidity for 1200 hours;
Subjecting the lens 22 to 10 cycles of the test profile shown in FIG. 2, including a first set of 5 cycles that include exposing the lens 22 to the portion of the cycle wherein the temperature drops to −10 degrees, and then a second set of 5 cycles wherein that portion of the cycle is replaced by ramping the lens 22 from 45 degrees Celsius to 25 degrees Celsius;
Dropping a lens with a front cover thereon from a selected height, such as 1 m, onto a concrete or steel surface;
Running the lens 22 under 6 shock pulses with 100 g and 10 ms half-sine pulses, one in each opposite direction of 3 perpendicular axes;
Exposing the lens 22 to a vibration test for 27 hours in the X-axis, 27 hours in the Y-axis and 81 hours in the Z-axis, with a RMS acceleration value of 27.8 m/s$^2$ according to the power spectrum density/frequency table shown in FIG. 3;
Exposing the lens 22 to the following test procedure relating to abrasion resistance: Prepare 1000 ml of sludge in which 100 g of Kanto loam (JIS Z 8901 class 8) is dissolved. Soak a sponge in the sludge and scrub the lens surface with the sponge for 250 repetitions, applying 20N of pressing force while scrubbing.

Exposing the lens 22 to heavy splash shower, car wash spray mist and dust, with the condition that any moisture condensation in the lens assembly 12 dissipates within 10 minutes;

Exposure to water without leakage therepast in accordance with ISO standard 20653;

Meeting IP Code 7 and 6K requirements;

Heating the lens 22 to 85 degrees Celsius for 1 hour, spraying the upper body of the lens 22 with 1200 psi water stream for 2 minutes at a 0 degree angle, a 90 degree angle and at a 45 degree angle relative to the lens axis, respectively;

Soaking the lens in water at 95 degrees Celsius for 1 hour and then immediately dunk the upper body of the lens 22 in room temperature water at a depth of 15 cm for 30 minutes;

Meeting ISO Standard 20653 with respect to dust requirement, and meeting IP Code 6K for protection against foreign objects. For the testing a vertical flow chamber is preferably used, with a dust density of 2 kg/m$^3$ for 8 hours continuous circulation.

Exposing the upper part of the lens to 5% salt water at 35 degrees Celsius for 96 hours;

Testing that the front glass surface of the lens 22 and the upper exterior body of the lens 22 resist the following chemicals: Automatic transmission fluid, hypoid lubricant, hydraulic fluid, power steering fluid, differential lubricant, central hydraulic fluid, engine oil, engine wax protective, engine coolant/Ethylene Glycol, gasoline, diesel fuel, kerosene, bio-diesel/Methanol based fuel, brake fluid, windshield washer fluid, window glass cleaner, car wash cleaner/soap solution, car wax and silicone protectants, leather wax, battery acid—dilute sulfuric acid (density: 1.285 g/cm$^3$), and $CaCl_2$);

For each chemical tested, the test is preferably conducted for 24 hours of exposure. The test is conducted in accordance with the following procedure:

1. Place test sample in a temperature chamber maintained at 40° C. on a test fixture representative of in-vehicle position with any protective surrounding structures.
2. Keep test sample at 40° C. for one hour. Remove sample from the chamber and apply 100 ml of test chemical/fluid by either spraying or pouring to front glass surface and upper exterior body. Store the sample at outside ambient temperature (RT) for 1 hour.
3. Replace the sample in the chamber and keep it at 40° C. for one hour. Then ramp up the chamber temperature to 70° C. (60° C. for battery acid) within 30 minutes and keep the sample at that temperature for 4 hours (dwell time). Ramp down the chamber temperature to 40° C. within 30 minutes.
4. Repeat step B and C for the same fluid but prolong dwell time from 4 hours to 12 hours at high temperature.
5. Repeat step B, C and D for the next fluid in the set. Continue the process up to a maximum of four fluids per sample.

Exposing the lens to a test procedure laid out in IEC 60068-2-60 method 4, whereby the lens 22 is exposed to H2S in a gas concentration of 10 ppb, $SO_2$ in a gas concentration of 200 ppb, Chlorine in a gas concentration of 10 ppb and $NO_2$ in a gas concentration of 200 ppb;

Subjecting the lens 22 to UV exposure test as referenced to SAE J1960v002, with a minimum exposure level is 2500 KJ/m$^2$. There must be no significant change of color and gloss level or other visible detrimental surface deterioration in any part of the lens upper body. The lens upper body includes and is not limited to lens cap surface, the subsurface under the first glass element, top glass and its surface coating. There is preferably no crack, crazing, bubbles or any defect or particles appear after UV exposure in and on any of the glass or plastic lens elements and its coatings.

The lens cap is preferably black and free of ding, dig, crack, bur, scratch, or other visible defects. There must be no visible color variation on a lens cap and among lenses.

The coating of the first glass is preferably free of dig, scratch, peeling, crack, bubble or flaking. The color appearance of the AR coating should have no or minimum visible color variation among lenses.

The interior of the lens 22 (at the mating surfaces of the constituent lens elements) preferably has little or no moisture inside it, which can cause water spots on the inside surfaces of the lens 22 after cycles of condensation and subsequent evaporation, and which can leak out from the lens 22 into portions of the camera 10 containing electrical components thereby causing problems with those electrical components. Preferably, the lens 22 is manufactured in a controlled, low-humidity environment. Other optional steps that can be taken during lens manufacture include: drying the interior surfaces of the lens 22, and vacuum packing the lens for transportation.

Figure 5A:
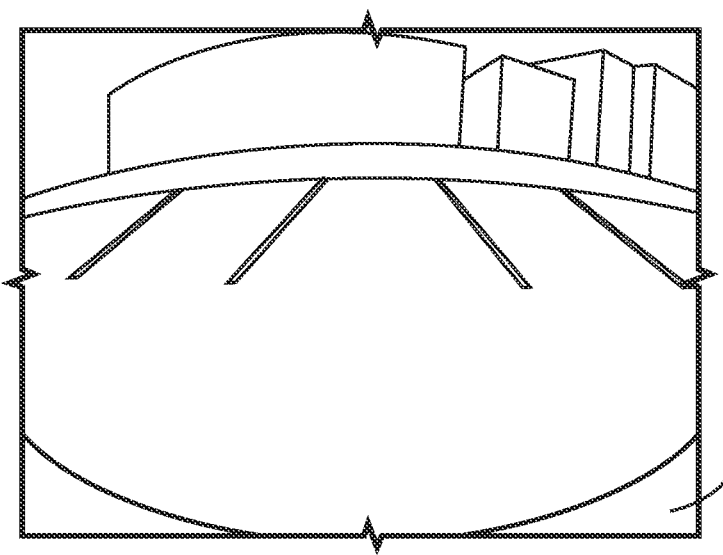
FIGS. 5a, 5b and 5c are images taken using the camera shown in FIG. 1 with different amounts of distortion correction.
Figure 5B:
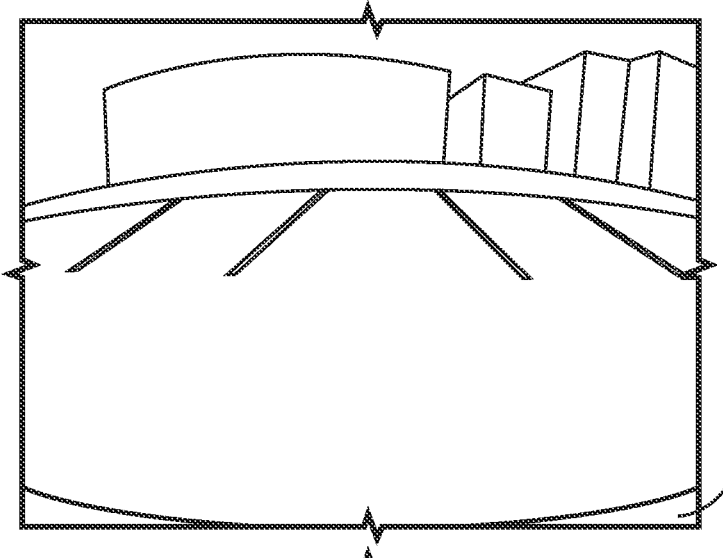

The manufacture of the lens 22 using a plurality of lens elements that are joined together can optically correct for distortion that can otherwise occur. Such optical distortion correction is advantageous particularly for a lens with a field of view that approaches 180 degrees horizontally, but is also advantageous for a lens 22 with a lesser field of view, such as a 135 degree field of view. An example of the effects of optical distortion correction is shown in FIG. 5b. The multiple lens elements that are provided in the lens each have selected optical properties, (e.g., refractive index), and are shaped in a selected way to optically dewarp the image produced by the lens, as compared to a single element, spherical lens.

Aside from optical distortion correction, the camera 10 preferably also provides other forms of distortion correction. To carry this out, selected techniques may be employed. For example, one technique is to position the lens 22 so that the horizon line (shown at 28) in the field of view (shown at 30) lies near the optical axis of the lens 22 (shown at 32). As a result, there will be less distortion in the horizon line in the image sent from the camera 10 to the in-vehicle display. Aside from positioning the lens 22 so that the horizon line is closer to the optical axis of the lens 22, the microcontroller 18 preferably processes the image to straighten the horizon line digitally (i.e., by compressing and/or stretching selected vertically extending portions of the image). In some embodiments, the amount of distortion in the image will increase proportionally with horizontal distance from the optical axis. Thus, the amount of compression or stretching of vertically extending strips of the image will vary depending on the horizontal position of the strip. The portions of the image to stretch or compress and the amounts by which to compress them can be determined empirically by testing an example of the camera so as to determine the amount of distortion present in vertically extending portions (i.e., vertical strips) of the image that contain image elements that have a known shape. For example, the horizon line should appear as a straight horizontal line in camera images. Thus when testing the camera, values can be manually calculated for use to compress or stretch vertically extending portions (e.g., strips) above and below the horizon line so that the horizon line appears straight in the image. These values can then be used in production versions of the camera that will have the same lens and the same orientation relative to the horizon line. As an alternative instead of manually calculating the compression and stretch values to apply to vertical strips of the image, the microcontroller 18 may be programmed to carry out a horizon line detection routine, taking into account that the horizon line is vertically close to the optical axis in the center region of the image to assist the routine in finding the horizon line. It will be understood that other selected known elements could be positioned proximate the optical axis and used instead of the horizon line.

The microcontroller 18 (FIG. 1) is preferably further programmed to stretch or compress other selected portions of the image so that other selected, known image elements in the image appear closer to how they would appear if the image was not distorted. For example, the microcontroller 18 may carry out an edge detection routine to determine where the edge of the bumper appears in the image. Alternatively, testing can be carried out on the camera to manually determine where the bumper is in the image. Once the edge of the bumper is located either manually or by use of an edge detection routine, values can be determined to use to compress or stretch vertically extending portions (i.e., strips) above and below the edge of the bumper to adjust the position of the edge of the bumper so that it more closely matches a selected shape (i.e., so that it more closely matches the shape it should have if the image were not distorted). It will be understood that the 'selected shape' of the bumper edge may be a horizontal line if the bumper has a rear edge that is straight. However, the selected shape may be a curve since many vehicle bumpers have rear edges that are curved.

Aside from reducing the amount of warping in the portions of the image containing the bumper and the horizon line, the microcontroller 18 can also modify the image in a way to make vertical elements of the image appear approximately vertical. These digital distortion correction steps can take place in a selected order. For example, the first step can be to straighten the vehicle bumper. A second step can be to straighten the horizon line. A third step can be to straighten vertical objects.

In embodiments or applications wherein other artifacts are always in the image received by the camera 10, these artifacts may be used to determine the image modification that can be carried out by the microcontroller 18 to at least straighten out portions of the image that show the artifacts.

Figure 5C:
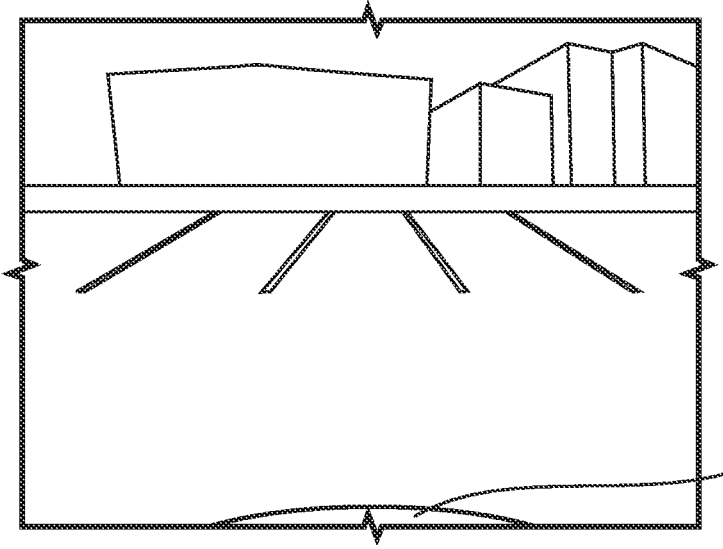

As shown in FIG. 5*c*, the combination of digital distortion correction and optical distortion correction reduces the amount of overall distortion in the image sent by the camera to an in-vehicle display.

In addition to the distortion correction, the microcontroller 18 is preferably capable of providing a plurality of different image types. For example, the microcontroller 18 can provide a standard viewing mode which gives an approximately 135 degree field of view horizontally, a 'cross-traffic' viewing mode which gives an approximately 180 degree field of view horizontally, and a bird's eye viewing mode, which gives a view that appears to be from a camera that is spaced from the vehicle and is aimed directly downwards. The standard viewing mode (with optical and digital distortion correction) is shown in FIG. 5*c*.

Figure 6:
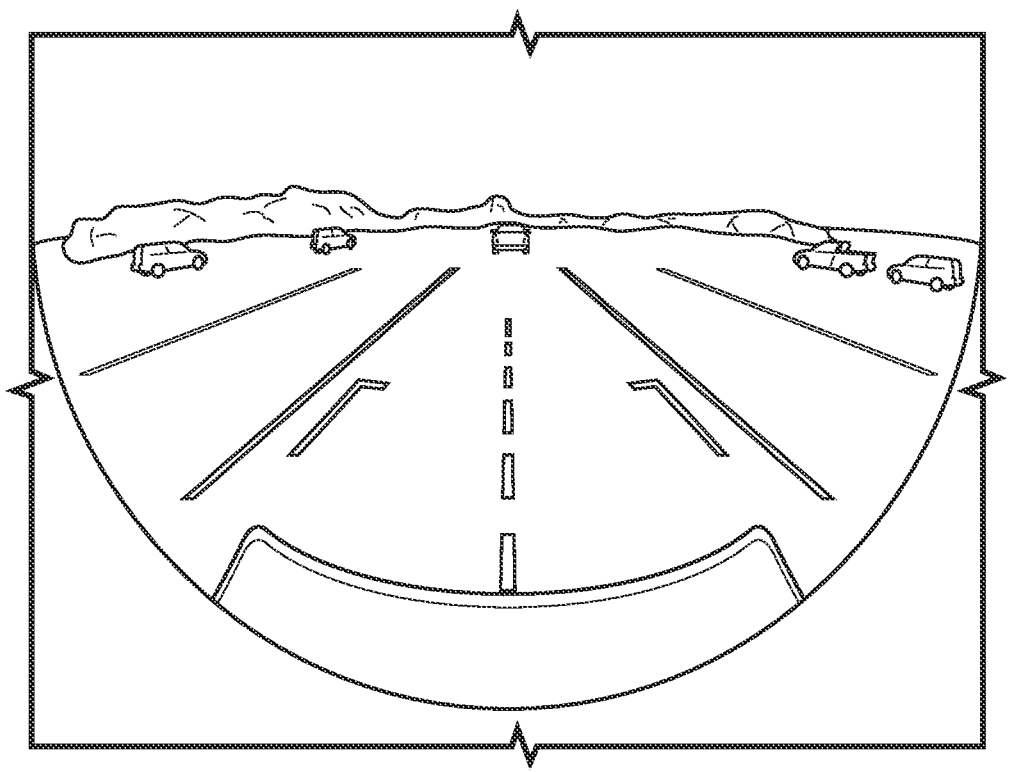
FIG. 6 is an image from the camera shown in FIG. 1, when in a cross-traffic viewing mode.

The cross-traffic viewing mode is shown in FIG. 6. The cross-traffic viewing mode provides a view of the regions behind to the left and behind to the right of the vehicle, so that a driver can determine, for example, whether it is safe to back out of a parking spot in a parking lot. The cross-traffic view provides the driver with an approximately 180 degree view. This permits the driver to see to the left of the vehicle, to the right of the vehicle and directly behind the vehicle all at once. The digital dewarping (i.e., the digital distortion correction) that is carried out by the microcontroller 18 (FIG. 1) for the cross-traffic view is different than the digital dewarping that is carried out for the standard view.

It will be understood that, in order to provide the cross-traffic viewing mode, the lens 22 (FIG. 1) is constructed to have a field of view of approximately 180 degrees horizontally (i.e., it is a 180 degree lens). That same lens 22 is also used when the camera provides the standard viewing mode with the 135 degree field of view. Accordingly, the standard viewing mode involves cropping portions of the image taken by the 180 degree lens 22.

While a 180 degree lens 22 is preferable for the camera 10, it is alternatively possible for the lens 22 to be a 135 degree lens. In such a case, the camera 10 would not provide a cross-traffic viewing mode.

Figure 7:
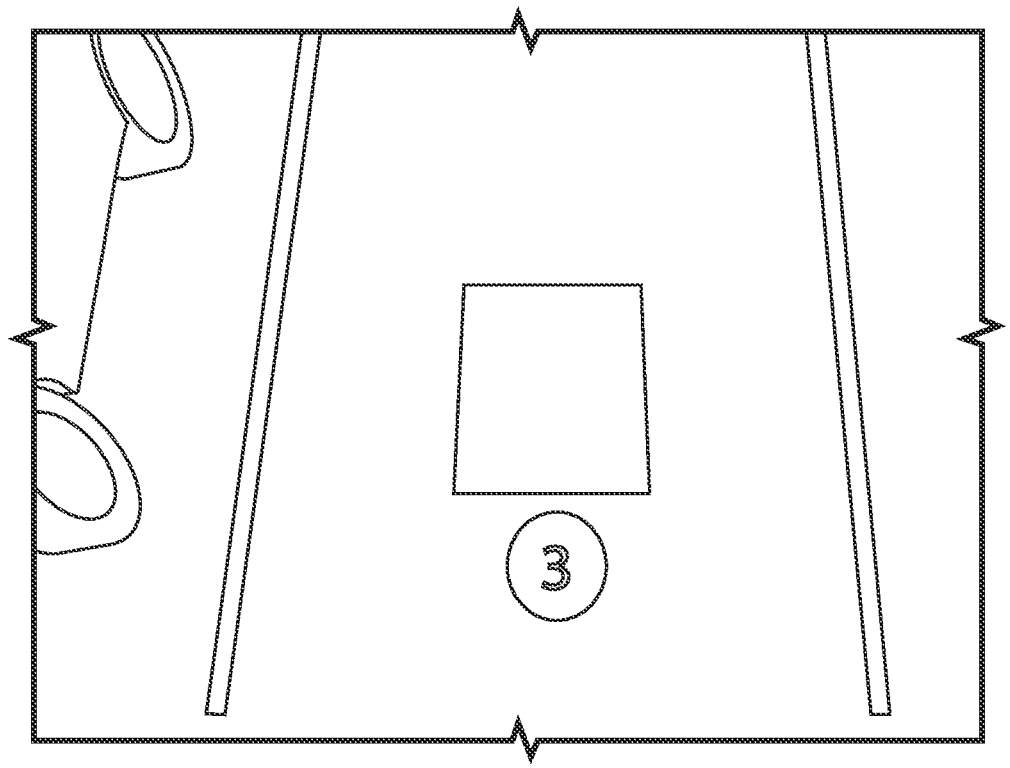
FIG. 7 is an image from the camera shown in FIG. 1, when in a bird's eye viewing mode.

The bird's eye viewing mode (FIG. 7) can be provided by compressing selected portions of the image and expanding other portions of it, thereby moving the apparent viewpoint of the camera 10.

The bird's eye viewing mode can be used, for example, to assist the driver when backing up the vehicle to connect it to a trailer hitch. The bird's eye viewing mode provides a view that appears to come from a viewpoint that is approximately directly above the tow ball on the vehicle. This viewing mode is discussed further below.

Figure 8:
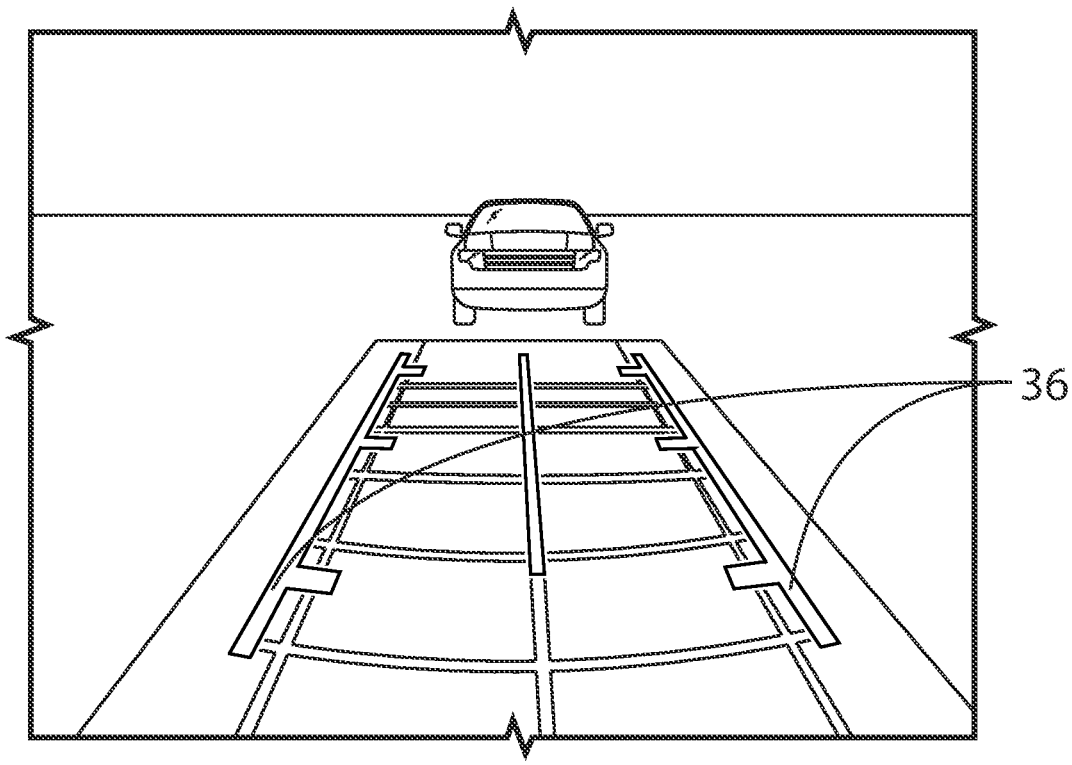
FIG. 8 is an image from the camera shown in FIG. 1, showing a static overlay applied to the image.

In addition to providing a plurality of viewing modes, the camera 10 is preferably capable of providing graphical overlays on the images prior to the images being sent from the camera 10 to an in-vehicle display. Preferably, the camera 10 can provide both static overlays and dynamic overlays. Static overlays are overlays that remain constant in shape, size and position on the image. An example of a static overlay is shown at 36 in FIG. 8. The static overlay 36 shown in FIG. 8 provides information regarding the width of the vehicle and rough distance information behind the vehicle.

Figure 9:
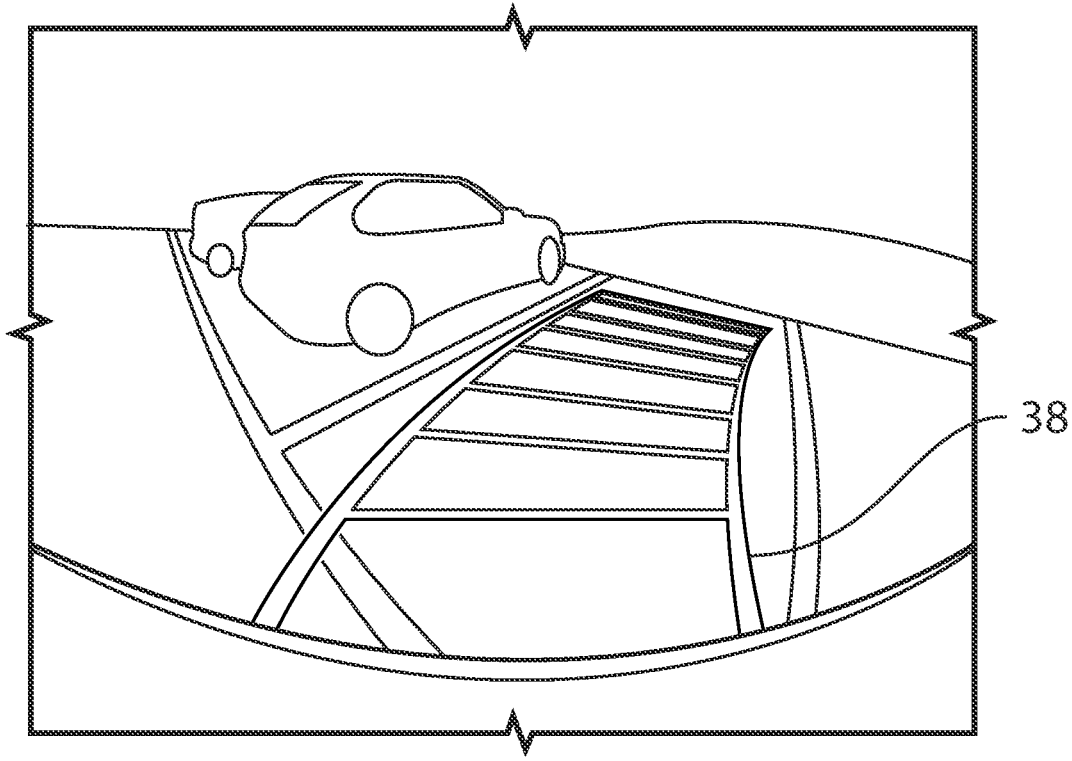
FIG. 9 is an image from the camera shown in FIG. 1, showing a dynamic overlay applied to the image.

Many different types of dynamic overlay can be provided for many different functions. A first example of a dynamic overlay is shown at 38 in FIG. 9. The dynamic overlay 38 shows the vehicle's projected path based on the current steering wheel angle of the vehicle. It will be noted that the overlay 38 may have a selected degree of transparency, so that the image behind it shows through and is thus not completely obscured.

Figure 10:
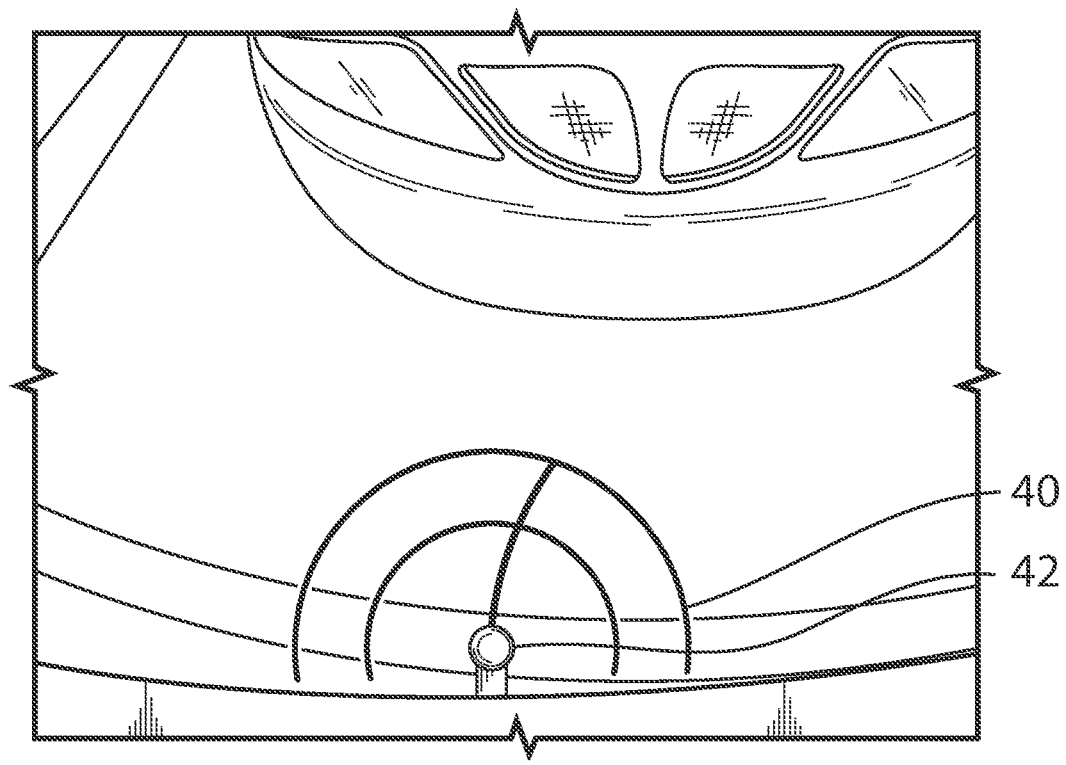
FIG. 10 is an image from the camera shown in FIG. 1, when the camera is in a hitch mode, showing a dynamic overlay applied to the image.

Another example of a dynamic overlay is shown at 40 in FIG. 10. The overlay 40 shows the projected path of the tow ball of the vehicle based on the vehicle's current steering angle. This overlay 40 gives the driver useful information when backing the vehicle up to align the tow ball shown at 42 with a hitch (not shown). It will be noted that the camera 10 is operating in a hitch viewing mode to provide the image shown in FIG. 10. The hitch viewing mode incorporates the bird's eye viewing mode, along with a digital zoom function that provides the driver with a magnified view of the tow ball 42 and its immediate surroundings. This view, combined with the overlay 40 gives the driver detailed information so that the driver can align the tow ball 42 with a hitch relatively precisely. It will be understood that the tow ball could alternatively be any other type of towing device.

Figure 11:
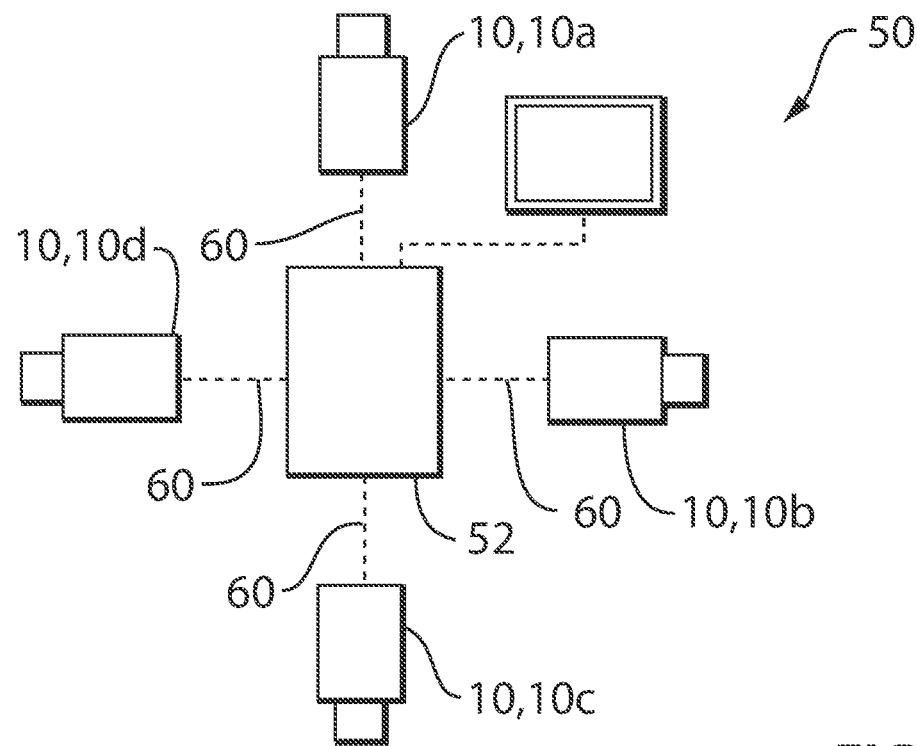
FIG. 11 is a schematic illustration of a vehicle surround view system that uses a plurality of the cameras shown in FIG. 1.
Figure 12:
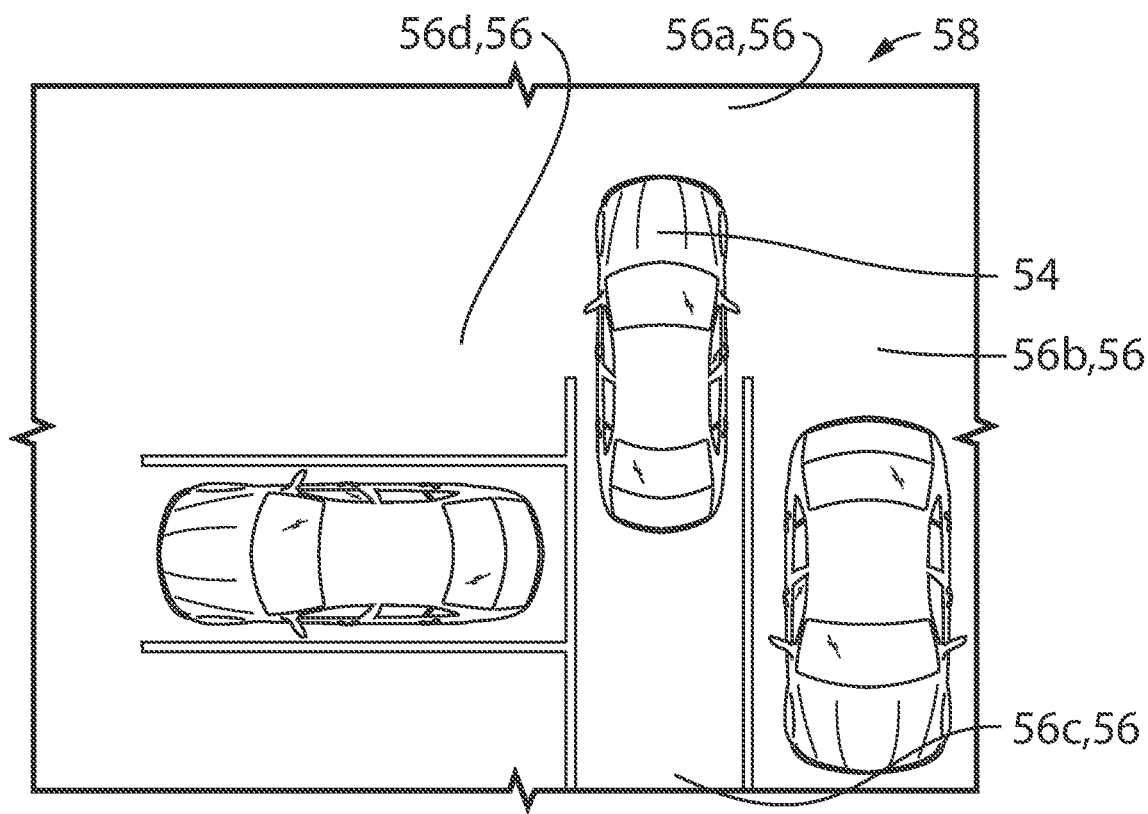
FIG. 12 is an image taken using the vehicle surround view system shown in FIG.

Another application of the camera 10 that combines the features of overlays and the bird's eye viewing mode is in a 360 degree view system, an example of which is shown at 50 in FIG. 11. The 360 degree view system 50 includes four cameras 10, including a front camera 10a, a rear camera 10b, a driver's side camera 10c and a passenger side camera 10d, and a central controller 52. Each of the cameras 10a, 10b, 10c and 10d can be operated in a bird's eye viewing mode and can provide images to the central controller 52. The central controller 52 can then put together an image shown in FIG. 12, with a static overlay 54 which would be a representation of a top view of the vehicle along with the four bird's eye views shown at 56 and individually 56a, 56b, 56c and 56d from the four cameras 10 (FIG. 11). The bird's eye views 56a, 56b, 56c and 56d are preferably merged together into a single image 58 without any seam lines where one view 56 mates with another.

Because the cameras 10 are each capable of dewarping the images they receive, and of processing the images to provide a bird's eye view, and of adding graphic overlays on the images, the cameras 10 can be used for all of these functions and the processed images produced by the cameras 10 and be sent to the central controller 52 using inexpensive electrical cables, such as shielded twisted (or untwisted) pair cables, shown schematically in FIG. 11 at 60. These electrical cables 60, in addition to being relatively inexpensive are also relatively flexible, making them easy to route through the vehicle between the cameras 10 and the central controller 52.

By contrast, if such as a system were provided with cameras that were not themselves equipped with sufficiently powerful on-board microcontrollers 18 to carry out the aforementioned functions, the functions would have to be carried out externally, e.g., by the central controller 52. In such a situation, the raw images received by the cameras 10 would have to be sent to the central controller 52 for processing. A relatively great amount of care would need to be taken to ensure that the raw images were transmitted to the central controller 52 in relatively pristine condition, since the processing of the images will result in some degradation of the images. In order to minimize the degradation of the images in their transmission from the cameras to the central controller, the electrical cables and any connectors could be relatively expensive (e.g., coaxial cable). In addition, the electrical cables could be relatively inflexible and difficult to route through the vehicle.

Figure 13:
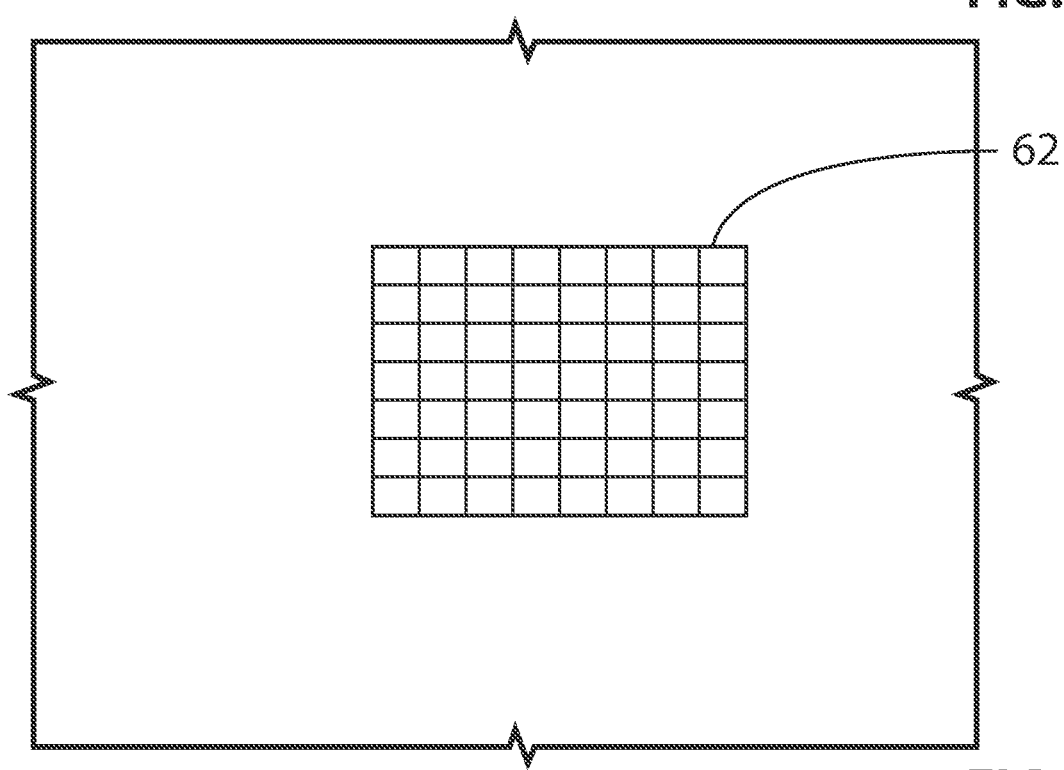
FIG. 13 is an image from the camera shown in FIG. 1, during a procedure to align the lens and imager.

Reference is made to FIG. 1. Because the camera 10 has the capability of applying graphic overlays to the image using the on-board microcontroller 18, the overlays can be aligned to the optical axis of the lens 22 before the camera 10 leaves the assembly facility. The camera 10 may be held in a fixture that is itself positioned at a known position relative to a selected reference pattern, shown at 62 in FIG. 13. When in the fixture, the image received by the camera's imager 16 is sent to an external controller (not shown). The external controller compares the image received from the camera 10 with the image that would have been received if the center of the imager 16 (FIG. 2) were precisely aligned with the optical axis of the lens 22 (FIG. 1). The offset between the actual and theoretically perfect images indicates the amount of offset present between the optical axis of the lens 22 and the center of the imager 16. This offset provides the camera 10 with an offset value to apply to certain types of overlays when they are provided on the image, such as the static overlay 36 shown in FIG. 8, the dynamic overlay 38 shown in FIG. 9, and the dynamic overlay 40 shown in FIG. 10. By aligning the overlay to the optical axis of the lens 22, a source of error in the positioning of the overlays is eliminated.

Figure 14:
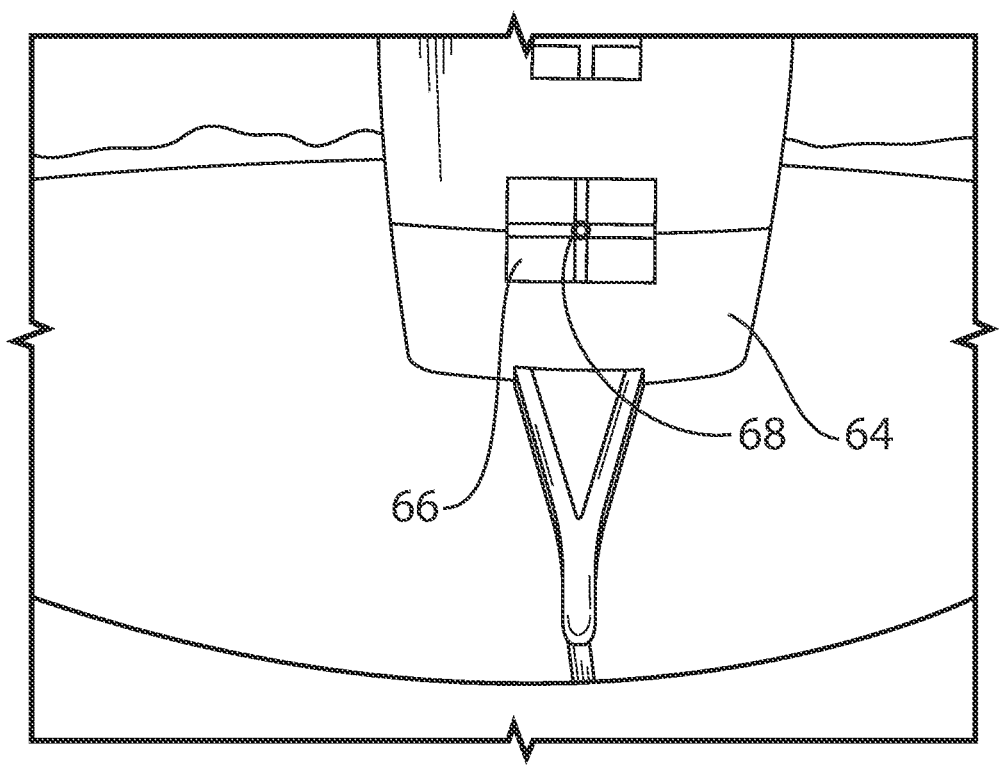
FIG. 14 is an image from the camera shown in FIG. 1 when the camera is in a trailer mode.

Reference is made to FIG. 14, which shows a trailer 64 with a target shown at 66. The microcontroller 18 is capable of identifying selected target shapes in images received on the imager 16. In the embodiment shown in FIG. 14, the target is a cross. With the trailer 64 positioned directly behind the vehicle (i.e., at a zero angle relative to the vehicle), the driver 10 can instruct the camera 10 to enter a 'trailer' mode, wherein the microcontroller 18 finds the center of the target 66. Once found, the microcontroller 18 applies an overlay shown at 68 to the image of the target 66. The overlay 68 may be a spot that appears at the center of the target 66. As the driver backs up the vehicle, the target 66 will shift in the image transmitted from the camera 10 to the in-vehicle display, but the overlay 68 is held in a fixed position, and thus the driver will see an offset between the overlay 68 and the center of the target 66 depending on the angle between the trailer 64 and the vehicle. By steering the vehicle so that the overlay 68 remains at the center of the target 66, the driver can back the vehicle up keeping the trailer 64 and the vehicle aligned. It will be understood that the overlay 68 need not be a dot and need not be at the center of the target 66. The system will be useful even if the overlay 68 is near the target 66 but not covering the target 66. Thus, the overlay 68 can be used if it is proximate the target 66 (i.e., sufficiently close to the target 66 or covering some or all of the target 66 that relative movement between the target 66 and the overlay 68 is noticeable by the driver of the vehicle).

Figure 15:
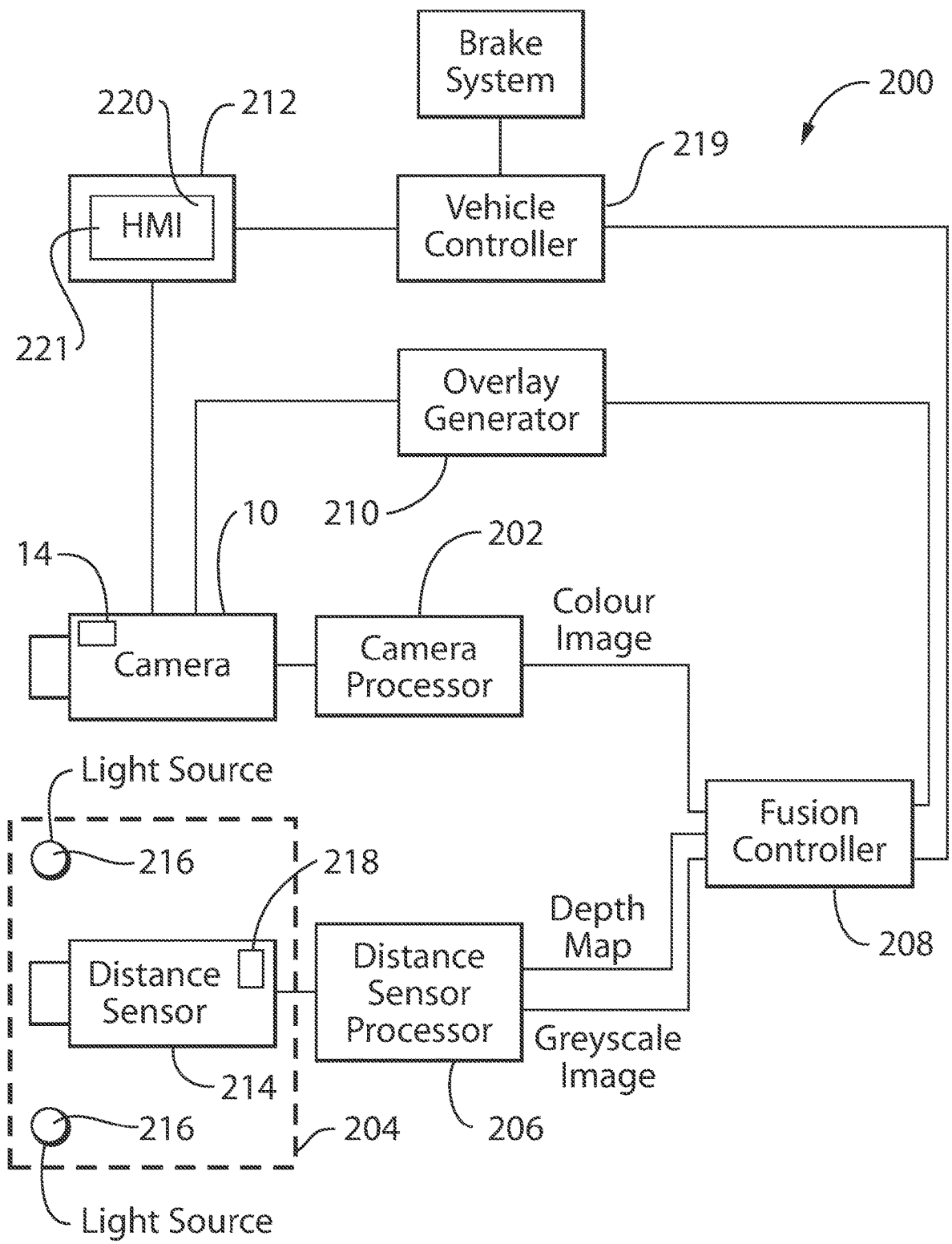
FIG. 15 is a schematic illustration of a camera system that is used for object detection using the camera shown in FIG. 1.

Reference is made to FIG. 15, which shows a schematic illustration of a camera system 200 that provides obstacle detection to the driver of the vehicle. The camera system 200 includes the camera 10, a camera processor 202, a distance sensor system 204, a distance sensor processor 206, a fusion controller 208, an overlay generator 210 and a Human/Machine Interface (HMI) 212. The camera 10 as described receives a first image on the imager 14 (FIG. 1). The first image has a first resolution that depends on the resolution of the imager 14. For a typical application, the resolution is preferably 640×480 pixels. The first image itself does not contain any explicit distance information regarding the distances of objects behind the vehicle, however, the camera processor 202 is configured to process the first image to detect objects of interest in the first image (e.g., people, animals, other vehicles) and to determine whether such objects of interest represent a collision risk.

The distance sensor system 204 preferably includes an infrared time-of-flight sensor 214 (which may be referred to as a TOF sensor) and a plurality of light sources 216. The light sources 216 emit modulated light, which reflects off any objects behind the vehicle. The reflected light is received by an imager 218 that is part of the TOF sensor 214. The image that is formed on the imager 218 is a greyscale image, which may be referred to as a second image. The second image has a second image resolution that depends on the resolution of the imager 218. In a typical application, the second image resolution will be lower than the resolution of the first image with the camera 10. The first and second images may be processed by the fusion controller 208 to generate a stereo image, which provides the fusion controller 208 with depth information relating to objects in the two images. The fusion controller 208 uses the depth information to determine if any objects behind the vehicle represent a collision risk, in which case the fusion controller 208 determines what action, if any, to take. One action that can be taken is for the fusion controller 208 to send a signal to a vehicle control system (shown at 219) to apply the parking brake, or the regular vehicle brakes or to prevent their release. Additionally, the fusion controller 208 communicates with the overlay generator 210 to apply an overlay on the image warning the driver of the object or objects that represent a collision risk. The overlay could, for example be a box around any such objects in the image. The overlay generator 210 may communicate the overlay information back to the camera 10, which then sends the image with the overlay to the in-vehicle display, shown at 220, which makes up part of the HMI 212. The rest of the HMI may be made up of a touch screen input 221 that is superimposed on the display 220. In order to override the system 200 and release the applied brake, the driver can interact with the HMI 212 to press a selected on-screen button to indicate to the system 200 that the objects have been seen and the driver does not feel that they represent a collision risk, at which time the system 200 can release the applied brake. In addition to the overlay, the driver of the vehicle can be notified of a collision risk by way of sound (e.g., a chime, a beep or a voice message) or by way of tactile feedback, such as by vibration of the steering wheel or seat.

Additionally, the image received by the imager 218 can be processed by the distance sensor processor 106 to determine the phase shift of the light at each pixel on the imager 218. The phase shift of the light is used to determine the distance of the surface that reflected the light to the TOF sensor 214. Thus, the distance sensor processor 206 can generate a depth map relating to the image. Optionally, the distance sensor processor 206 processes the pixels in groups and not individually. For example, the processor 206 may obtain average phase shift data from groups of 2×2 pixels. Thus, the depth map has a third resolution that is lower than the second image resolution.

The depth map is sent to the fusion controller 208, which can interpret it to determine if any objects shown therein represent a collision risk. The fusion controller 208 preferably works with both the depth map and the camera image to improve the determination of whether detected objects are collision risks. For example, the fusion controller 208 may determine from the depth map, that there is an object that is within 2 meters from the vehicle towards the lower central portion of the depth map. However, the fusion controller 208 may determine from the camera processor 202 that the object in that region is a speed bump, in which case the fusion controller 208 may determine that this does not represent a collision risk and so the system 200 would not warn the driver, and would not apply the brake.

In different situations, the fusion controller 208 gives greater weight to the information from either the depth map or the camera image. For example, for objects that are farther than 3 meters away, the fusion controller 208 gives greater weight to information from the camera 10 and the camera processor 202. For objects that are closer than 3 meters (or some other selected distance) away, the fusion controller 208 gives greater weight to information from the distance sensor 204 and the distance sensor processor 206.

The camera processor 202 is configured to recognize certain types of object in the images it receives from the camera 10, such as an adult, a child sitting, a toddler, a vehicle, a speed bump, a child on a bicycle, tall grass, fog (e.g., fog from a sewer grating or a manhole, or fog from the exhaust of the vehicle itself). In some situations, the fusion controller 208 determines whether there is movement towards the vehicle by any objected in the images it receives. In some situations, when the fusion controller 208 determines from the depth map that an object is too close to the vehicle, it uses information from the camera processor 202 to determine what the object is. This assists the fusion controller 208 in determine whether the object is something to warn the driver about (e.g., a child, or a tree), or if it is something to be ignored (e.g., exhaust smoke from the vehicle itself, or a speed bump). Additionally, this information can also be used by the overlay generator 210 to determine the size and shape of the overlay to apply to the image. It will be understood that some of the elements recognized by the camera processor 202 belong to a category containing objects of interest, such as the adult, the child sitting, the toddler, the vehicle and the child on the bicycle. Other elements recognized by the camera processor 202 may belong to a category of elements that do not represent a collision risk, such as, a speed bump, tall grass and fog.

After the TOF sensor 214 and the camera 10 are installed on the vehicle, a calibration procedure is preferably carried out. The calibration procedure includes displaying an image with high contrast elements on it, at a selected distance from the vehicle, at a selected position vertically and laterally relative to the vehicle. The image can be for example, a white rectangle immediately horizontally adjacent a black rectangle. The fusion controller 208 determines the relative positions of the mating line between the two rectangles on the two imagers 16 and 218. During use of the camera system 200 this information is used by the fusion controller 208 to determine the distances of other objects viewed by the camera 10 and the TOF sensor 214. The calibration procedure could alternatively be carried out using a checkerboard pattern of four or more rectangles so that there are vertical and horizontal mating lines between rectangles.

Throughout this disclosure the term imager and image processor have been used. These terms both indicate a device that includes an image sensor and some control elements. The microcontroller and the portion of the imager including the control elements together make up a 'controller' for the camera. It will be understood that in some embodiments, and for some purposes the control of the camera need not be split into the control elements in the imager and the microcontroller that is external to the imager. It will be understood that the term 'controller' is intended to include any device or group of devices that control the camera.

While the above description constitutes a plurality of embodiments of the present invention, it will be appreciated that the present invention is susceptible to further modification and change without departing from the fair meaning of the accompanying claims.

The invention claimed is:

1. A vehicular vision system, said vehicular vision system comprising:
  a camera comprising a lens and an image sensor, wherein the camera is disposed at a vehicle equipped with said vehicular vision system and has a field of view exterior of the equipped vehicle;
  a distance sensor disposed at the equipped vehicle and having a field of sensing exterior of the equipped vehicle;
  wherein the distance sensor comprises a plurality of infrared light-emitting light sources, and wherein the distance sensor senses infrared light;

a controller comprising at least one processor, wherein image data captured by the camera and sensor data captured by the distance sensor are processed at the controller;

wherein the controller, responsive to processing at the controller of image data captured by the camera and of sensor data captured by the distance sensor, detects an object present in the field of view of the camera and in the field of sensing of the distance sensor;

wherein the controller determines distance to the detected object based at least in part on difference between position of the detected object in image data captured by the camera and position of the detected object in sensor data captured by the distance sensor;

wherein the controller, responsive to processing at the controller of image data captured by the camera and of sensor data captured by the distance sensor, and responsive to the determined distance to the detected object, determines that the detected object represents a collision risk; and wherein, responsive to determination that the detected object represents a collision risk, the controller controls the equipped vehicle to mitigate the collision risk.

2. The vehicular vision system as claimed in claim 1, comprising a display disposed in an interior of the equipped vehicle and viewable by a driver of the equipped vehicle, and wherein the display displays video images derived from image data captured by the camera, and wherein the displayed video images include images of the detected object.

3. The vehicular vision system as claimed in claim 2, wherein the display displays an overlay that highlights the displayed detected object.

4. The vehicular vision system as claimed in claim 2, wherein the camera is positioned at an actual viewing angle, and wherein said vehicular vision system has a bird's eye viewing mode in which the displayed video images appear to be at an apparent viewing angle that is more vertically oriented than the actual viewing angle of the camera.

5. The vehicular vision system as claimed in claim 4, wherein the controller compresses a lower portion of captured image data and stretches an upper portion of captured image data so that the apparent viewing angle is more vertically oriented than the actual viewing angle.

6. The vehicular vision system as claimed in claim 4, wherein the equipped vehicle has a towing hitch, and wherein the towing hitch is in the field of view of the camera, and wherein said vehicular vision system has a hitch viewing mode in which the towing hitch in the displayed video images is magnified to a magnification level that is greater than a magnification level provided in the bird's eye viewing mode.

7. The vehicular vision system as claimed in claim 2, wherein the controller processes image data captured by the camera and processes sensor data captured by the distance sensor to determine a projected trajectory for the equipped vehicle, and wherein the controller applies a projected path overlay at the displayed video images, and wherein the projected path overlay comprises a representation of the projected trajectory.

8. The vehicular vision system as claimed in claim 2, wherein the controller modifies raw image data captured by the camera to produce a processed image, and wherein the controller determines position of a selected feature in the field of view of the camera and applies an overlay on the selected feature in an initial raw image data to produce an initial processed image, and wherein the controller thereafter holds the overlay in a fixed position in subsequent processed images regardless of movement of the selected feature in subsequent raw image data.

9. The vehicular vision system as claimed in claim 8, wherein the selected feature is a feature on a trailer being towed by the equipped vehicle.

10. The vehicular vision system as claimed in claim 1, wherein, responsive to determination that the detected object represents the collision risk, the controller alerts a driver of the equipped vehicle of the collision risk.

11. The vehicular vision system as claimed in claim 1, wherein, responsive to determination that the detected object represents the collision risk, the controller controls at least one vehicle component to mitigate collision by the equipped vehicle with the detected object.

12. The vehicular vision system as claimed in claim 11, wherein, responsive to determination that the detected object represents the collision risk, the controller controls braking of the equipped vehicle.

13. The vehicular vision system as claimed in claim 1, wherein image data captured by the camera has a first resolution and sensor data captured by the distance sensor has a second resolution that is lower than the first resolution.

14. The vehicular vision system as claimed in claim 1, wherein, prior to determining whether the detected object represents a collision risk, the controller determines whether the detected object falls within a category of objects that do not represent a collision risk based at least in part on processing of image data captured by the camera.

15. The vehicular vision system as claimed in claim 1, wherein, prior to determining whether the detected object represents a collision risk, the controller determines whether the detected object falls within a category of objects that represent objects of interest based at least in part on processing of image data captured by the camera.

16. The vehicular vision system as claimed in claim 15, wherein the category of objects that represent objects of interest include at least one selected from the group consisting of people, animals and other vehicles.

17. A vehicular vision system, said vehicular vision system comprising:

a camera comprising a lens and an image sensor, wherein the camera is disposed at a vehicle equipped with said vehicular vision system and has a field of view exterior of the equipped vehicle;

a distance sensor disposed at the equipped vehicle and having a field of sensing exterior of the equipped vehicle;

wherein the distance sensor comprises a plurality of infrared light-emitting light sources, and wherein the distance sensor senses infrared light;

a controller comprising at least one processor, wherein image data captured by the camera and sensor data captured by the distance sensor are processed at the controller;

wherein the controller, responsive to processing at the controller of image data captured by the camera and of sensor data captured by the distance sensor, detects an object present in the field of view of the camera and in the field of sensing of the distance sensor;

a display disposed in an interior of the equipped vehicle and viewable by a driver of the equipped vehicle, and wherein the display displays video images derived from image data captured by the camera, and wherein the displayed video images include images of the detected object;

wherein the controller determines distance to the detected object based at least in part on difference between position of the detected object in image data captured by the camera and position of the detected object in sensor data captured by the distance sensor;

wherein the controller, responsive to processing at the controller of image data captured by the camera and of sensor data captured by the distance sensor, and responsive to the determined distance to the detected object, determines that the detected object represents a collision risk; and wherein, responsive to determination that the detected object represents the collision risk, the controller alerts a driver of the equipped vehicle of the collision risk.

18. The vehicular vision system as claimed in claim 17, wherein the display displays an overlay that highlights the displayed detected object.

19. The vehicular vision system as claimed in claim 17, wherein the camera is positioned at an actual viewing angle, and wherein said vehicular vision system has a bird's eye viewing mode in which the displayed video images appear to be at an apparent viewing angle that is more vertically oriented than the actual viewing angle of the camera.

20. The vehicular vision system as claimed in claim 19, wherein the controller compresses a lower portion of captured image data and stretches an upper portion of captured image data so that the apparent viewing angle is more vertically oriented than the actual viewing angle.

21. The vehicular vision system as claimed in claim 19, wherein the equipped vehicle has a towing hitch, and wherein the towing hitch is in the field of view of the camera, and wherein said vehicular vision system has a hitch viewing mode in which the towing hitch in the displayed video images is magnified to a magnification level that is greater than a magnification level provided in the bird's eye viewing mode.

22. The vehicular vision system as claimed in claim 17, wherein the controller processes image data captured by the camera and processes sensor data captured by the distance sensor to determine a projected trajectory for the equipped vehicle, and wherein the controller applies a projected path overlay at the displayed video images, and wherein the projected path overlay comprises a representation of the projected trajectory.

23. The vehicular vision system as claimed in claim 17, wherein the controller modifies raw image data captured by the camera to produce a processed image, and wherein the controller determines position of a selected feature in the field of view of the camera and applies an overlay on the selected feature in an initial raw image data to produce an initial processed image, and wherein the controller thereafter holds the overlay in a fixed position in subsequent processed images regardless of movement of the selected feature in subsequent raw image data.

24. The vehicular vision system as claimed in claim 23, wherein the selected feature is a feature on a trailer being towed by the equipped vehicle.

25. A vehicular vision system, said vehicular vision system comprising:

a camera comprising a lens and an image sensor, wherein the camera is disposed at a vehicle equipped with said vehicular vision system and has a field of view exterior of the equipped vehicle;

a distance sensor disposed at the equipped vehicle and having a field of sensing exterior of the equipped vehicle;

wherein the distance sensor comprises a plurality of infrared light-emitting light sources, and wherein the distance sensor senses infrared light;

a controller comprising at least one processor, wherein image data captured by the camera and sensor data captured by the distance sensor are processed at the controller;

wherein the controller, responsive to processing at the controller of image data captured by the camera and of sensor data captured by the distance sensor, detects an object present in the field of view of the camera and in the field of sensing of the distance sensor;

wherein the controller determines distance to the detected object based at least in part on difference between position of the detected object in image data captured by the camera and position of the detected object in sensor data captured by the distance sensor;

wherein the controller determines whether the detected object falls within a category of objects that represent objects of interest based at least in part on processing of image data captured by the camera;

wherein the controller, responsive to processing at the controller of image data captured by the camera and of sensor data captured by the distance sensor, and responsive to determination that the detected object falls within a category of objects that represent objects of interest, and responsive to the determined distance to the detected object, determines that the detected object represents a collision risk;

wherein, responsive to determination that the detected object represents the collision risk, the controller controls braking of the equipped vehicle to mitigate collision by the equipped vehicle with the detected object; and wherein the detected object comprises a person.

26. The vehicular vision system as claimed in claim 25, wherein image data captured by the camera has a first resolution and sensor data captured by the distance sensor has a second resolution that is lower than the first resolution.

* * * * *